(12) United States Patent
Minotani et al.

(10) Patent No.: US 12,432,104 B2
(45) Date of Patent: Sep. 30, 2025

(54) COMMUNICATION DEVICE AND COMMUNICATION METHOD

(71) Applicant: Panasonic Intellectual Property Corporation of America, Torrance, CA (US)

(72) Inventors: Jun Minotani, Ishikawa (JP); Yoshio Urabe, Nara (JP); Takashi Iwai, Ishikawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 40 days.

(21) Appl. No.: 18/251,170

(22) PCT Filed: Aug. 20, 2021

(86) PCT No.: PCT/JP2021/030596
§ 371 (c)(1),
(2) Date: Apr. 28, 2023

(87) PCT Pub. No.: WO2022/097351
PCT Pub. Date: May 12, 2022

(65) Prior Publication Data
US 2023/0403187 A1    Dec. 14, 2023

(30) Foreign Application Priority Data
Nov. 6, 2020    (JP) .................................. 2020-185778

(51) Int. Cl.
*H04L 27/26*    (2006.01)
*H04L 1/00*    (2006.01)

(52) U.S. Cl.
CPC ........ *H04L 27/2603* (2021.01); *H04L 1/0009* (2013.01); *H04L 1/0025* (2013.01)

(58) Field of Classification Search
CPC .. H04L 27/2603; H04L 1/0009; H04L 1/0025
(Continued)

(56) References Cited

U.S. PATENT DOCUMENTS

| 2012/0069796 A1* | 3/2012 | Casaccia | ................. H04L 27/18 370/328 |
| 2018/0109358 A1 | 4/2018 | Xing et al. | |

(Continued)

FOREIGN PATENT DOCUMENTS

| EP | 2658142 A1 | 10/2013 |
| JP | 2018517321 A | 6/2018 |

(Continued)

OTHER PUBLICATIONS

IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," 802.11 Working Group, LAN/MAN Standards Committee, IEEE P802.11ax/D7.0, Sep. 2020. (822 pages).

(Continued)

*Primary Examiner* — Leila Malek
(74) *Attorney, Agent, or Firm* — Seed Intellectual Property Law Group LLP

(57) ABSTRACT

This communication device is provided with: a reception circuit that receives information pertaining to at least one of a plurality of modes which pertain to the allocation of a common data signal to a plurality of sub-carrier groups; and a control circuit that, on the basis of the information pertaining to the at least one mode, controls the synthesis of the signal allocated to the plurality of sub-carrier groups.

8 Claims, 25 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2018/0316467 | A1 | 11/2018 | Zhu et al. |
| 2019/0319752 | A1 | 10/2019 | Tang et al. |
| 2020/0119853 | A1 | 4/2020 | Hassan Hussein et al. |
| 2022/0377603 | A1* | 11/2022 | Kim .......................... H04L 1/08 |
| 2023/0283421 | A1 | 9/2023 | Lim et al. |

FOREIGN PATENT DOCUMENTS

| | | | | |
|---|---|---|---|---|
| JP | 2019503143 | A | 1/2019 | |
| JP | 2020523897 | A | 8/2020 | |
| JP | 2023532337 | A | 7/2023 | |
| WO | WO-2019240792 | A1 * | 12/2019 | ........... H04B 7/0452 |
| WO | WO-2021071149 | A1 * | 4/2021 | ........... H04L 5/0041 |

OTHER PUBLICATIONS

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," 802.11 Working Group, LAN/MAN Standards Committee, IEEE Std 802.11-2016, Dec. 7, 2016. (3534 pages).
International Search Report, mailed Nov. 2, 2021, for International Patent Application No. PCT/JP2021/030596. (5 pages) (with English translation).
Kim et al., "Consideration on Harq," LG Electronics, IEEE 802.11-19/0780r0, May 13, 2019. (16 pages).
Liu et al., "DCM for range extension in 6GHz LPI," Mediatek, IEEE 802.11-20/0986r1, May 28, 2020. (6 pages).
Porat, "6GHz LPI Range Extension," Broadcom, IEEE 802.11-20/0965r4, Aug. 4, 2020. (10 pages).
Extended European Search Report dated Apr. 3, 2024, for the corresponding European Patent Application No. 21888904.6, 13 pages.
Fraunhofer IIS, "Time and Frequency Domain Resource Allocation with K Repetitions," RI-1720991, Agenda Item: 7.3.3.4, 3GPP TSG-RAN WGI Meeting #91, Reno, USA, Nov. 27-Dec. 1, 2017, 7 pages.
Huawei et al., "Discussion on HARQ enhancement for NTN," RI-2005267, Agenda Item: 8.4.3, 3GPP TSG RAN WGI Meeting #102-e, E-meeting, Aug. 17-28, 2020, 5 pages.

* cited by examiner

|  | Coding rate (R) | LDPC information length (bits) | LDPC codeword length (bits) |
|---|---|---|---|
| Without IR | 1/2 | 972 | 1944 |
| With IR | 1/3 | 972 | 2916 |
FIG. 12
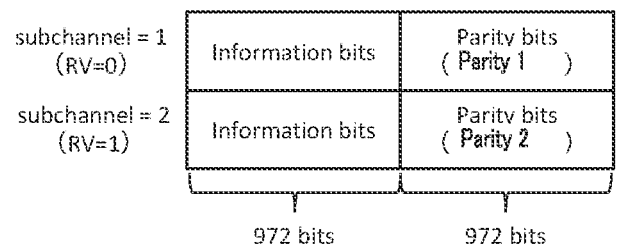
FIG. 13
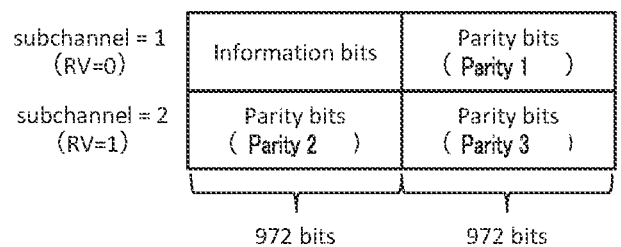
FIG. 14

|  | Coding rate (R) | LDPC information length (bits) | LDPC codeword length (bits) |
|---|---|---|---|
| Without IR | 1/2 | 972 | 1944 |
| With IR | 1/3 | 648 | 1944 |
FIG. 15
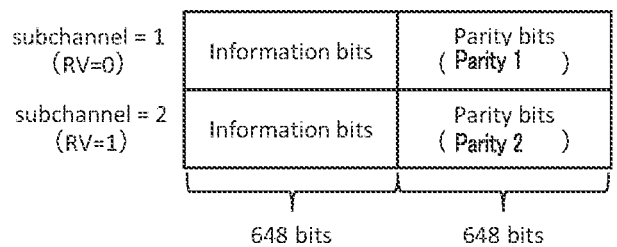
FIG. 16
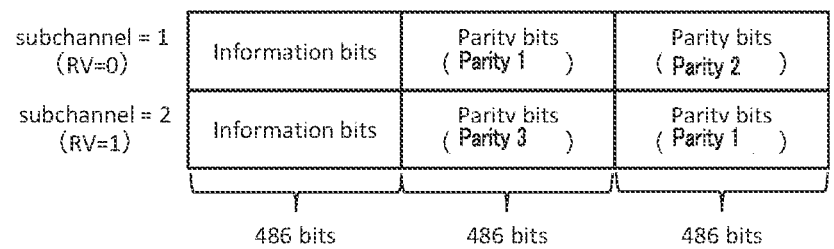
FIG. 17

| Circular Buffer length | NDI | $N_{dup}$ | RV of subchannel=1 | RV of subchannel=2 | RV of subchannel=3 | RV of subchannel=4 |
|---|---|---|---|---|---|---|
| 0~L (Nrv=4) | 0 | 2 | 1 | 2 | - | - |
| | | 4 | 1 | 2 | 3 | 0 |
| | 1 | 2 | 0 | 3 | - | - |
| | | 4 | 0 | 1 | 2 | 3 |
| L< | | ... | ... | ... | ... | ... |

Indication information

FIG. 25

| EHT-MCS index | Modulation | Code rate | $N_{dup}$ | RV of Subchannel=1 | RV of Subchannel=2 | RV of Subchannel=3 | RV of Subchannel=4 |
|---|---|---|---|---|---|---|---|
| TBD | DCM+BPSK | 1/2 | 2 | - | - | - | - |
| TBD+1 | DCM+BPSK+DUP | 1/2 | 2 | - | - | - | - |
| TBD+2 | | 1/3 | 2 | 0 | 1 | - | - |
| TBD+3 | | | | 1 | 2 | - | - |
| TBD+4 | EHT dup mode (DCM+IR) | 1/4 | 2 | 0 | 1 | - | - |
| TBD+5 | | | | 1 | 2 | - | - |
| TBD+6 | | | 4 | 0 | 1 | 2 | 3 |
| TBD+7 | | | | 1 | 2 | 3 | 0 |
| TBD+8 | EHT dup mode (IR) | 1/3 | 2 | 0 | 1 | - | - |
| TBD+9 | | | | 1 | 2 | - | - |
| ... | ... | | | ... | ... | | |

COMMUNICATION DEVICE AND COMMUNICATION METHOD

TECHNICAL FIELD

The present disclosure relates to a communication apparatus and a communication method.

BACKGROUND ART

Task Group (TG) be has been developing the technical specification of IEEE 802.11be (hereinafter, referred to as "11be") as the successor standard of the Institute of Electrical and Electronics Engineers (IEEE) 802.11ax (hereinafter, referred to as "11ax"), which is a standard of IEEE 802.11.

CITATION LIST

Non Patent Literature

NPL 1
IEEE P802.11ax D7.0, September 2019
NPL 2
IEEE 802.11-20/986r1, DCM for range extension in 6 GHz LPI, March 2020
NPL 3
IEEE 802.11-20/965r4, 6 GHz LPI Range Extension, August 2020
NPL 4
IEEE Std 802.11, 2016
NPL 5
IEEE 802.11-19/780r0, Consideration on HARQ, May 2019

SUMMARY OF INVENTION

There is room for further study, however, on methods of extending coverage in radio communication.

One non-limiting and exemplary embodiment facilitates providing a communication apparatus and a communication method each capable of extending coverage in radio communication.

A communication apparatus according to an exemplary embodiment of the present disclosure includes: reception circuitry, which, in operation, receives information on at least one of a plurality of modes relating to assignment of a data signal that is common, to a plurality of subcarrier groups; and control circuitry, which, in operation, controls combination of a signal that has been assigned to the plurality of subcarrier groups, based on the information on the at least one of the plurality of modes.

It should be noted that general or specific embodiments may be implemented as a system, an apparatus, a method, an integrated circuit, a computer program, a storage medium, or any selective combination thereof.

According to an exemplary embodiment of the present disclosure, it is possible to extend coverage in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 11 illustrates an exemplary generalized dup mode PPDU format;

FIG. 12 illustrates an exemplary setting of a coding rate according to Low-Density Parity-Check (LDPC) Configuration Example 1;

FIG. 13 illustrates an exemplary configuration of a Redundancy version (RV) according to LDPC Configuration Example 1:

FIG. 14 illustrates another exemplary configuration of an RV according to LDPC Configuration Example 1:

FIG. 15 illustrates an exemplary setting of a coding rate according to LDPC Configuration Example 2;

FIG. 16 illustrates an exemplary configuration of an RV according to LDPC Configuration Example 2:

FIG. 17 illustrates another exemplary configuration of an RV according to LDPC Configuration Example 2;

FIG. 25 illustrates exemplary combinations of RVs of subchannels according to Method 1;

FIG. 26 illustrates an exemplary Modulation and Coding Scheme (MCS) table according to Method 2:

FIG. 32 illustrates an exemplary PPDU format of Multi-User (MU) DCM.

DESCRIPTION OF EMBODIMENTS

Hereinafter, embodiments of the present disclosure will be described in detail with reference to the accompanying drawings.

[Dual Carrier Modulation (DCM)]

In 11be, for example, DCM has been discussed with the aim of extending a communicable range (e.g., also referred to as coverage) of a Low Power Indoor (LPI) terminal in a 6-GHz band (e.g., see Non Patent Literature (hereinafter referred to as "NPL") 1).

Figure 1:
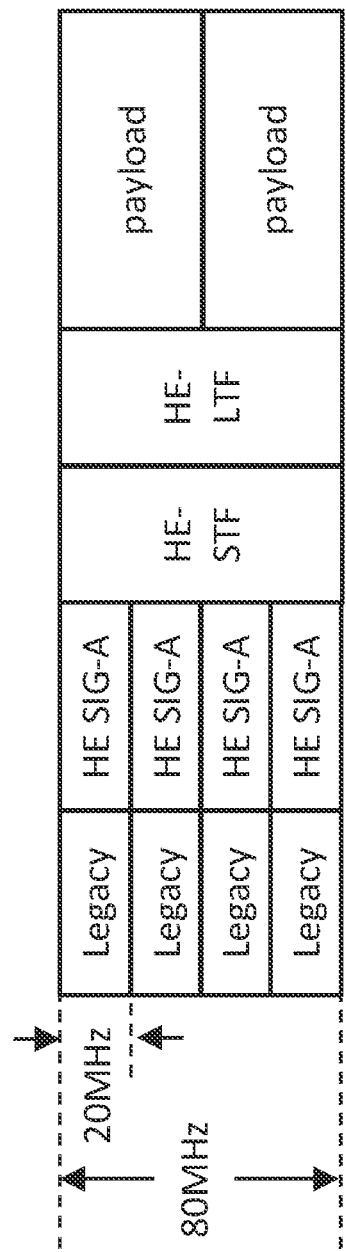
FIG. 1 illustrates an exemplary Dual Carrier Modulation High Efficient Single User Physical Layer Convergence Procedure Protocol Data Unit (DCM HE SU PPDU) format.

FIG. 1 illustrates a High Efficient Single User Physical Layer Convergence Procedure Protocol Data Unit (HE SU PPDU) format as an exemplary frame format of the DCM.

In the DCM, for example, a plurality (e.g., all) of data subcarriers is divided into two. For example, a group of the divided data subcarriers is referred to as a "subchannel." Further, in the DCM, for example, data (payload) that is common to (e.g., identical between) the subchannels (hereinafter may also be referred to as "common data") is assigned, and modulation mapping is individually applied to the subchannels.

For example, in 11be, two types of DCMs have been proposed.

The first method is to set (in other words, limit) the DCM to Modulation and Coding Scheme (MCS) 0 and to set (limit) the number of spatial streams (e.g., Spatial Streams (SSs)) to one. This method is referred to as Binary Phase-Shift Keying (BPSK)-DCM (see, e.g., NPL 2), for example.

The second method is to duplicate a plurality of BPSK-DCM signals in a non-punctured bandwidth (e.g., Bandwidth (BW) or channel BW) of a 6-GHz band and to transmit the duplicated signals to a single user (or referred to as a terminal (STA: Station)). This method is referred to as BPSK-DCM-duplicate (DUP) (see, e.g., NPL 3), for example. In one example, BPSK-DCM signals of 40, 80, and 160 MHz bandwidths may be respectively duplicated by using the non-punctured bandwidth of a 6-GHz band=80, 160, and 320 MHz and may be transmitted.

Figure 2:
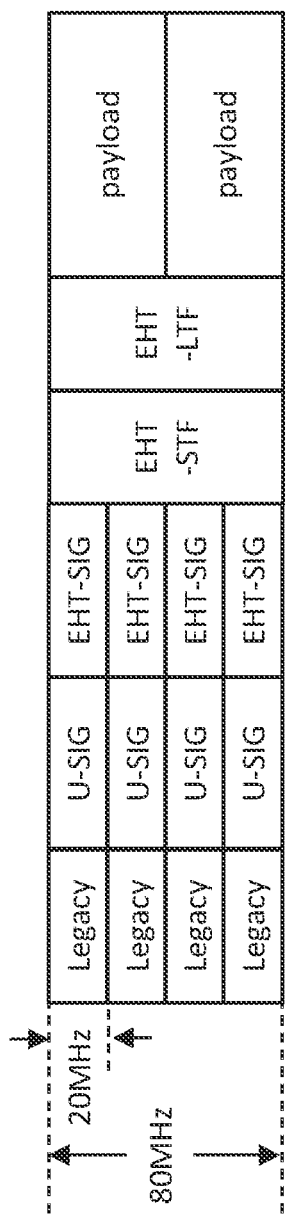
FIG. 2 illustrates exemplary Binary Phase-Shift Keying (BPSK)-DCM and BPSK-DCM-DUP PPDU format.
Figure 3:
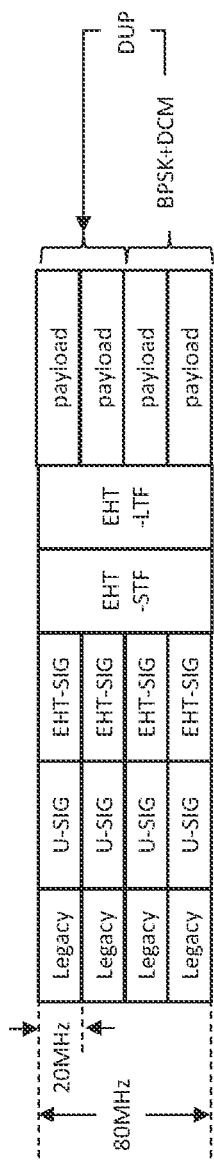
FIG. 3 illustrates an exemplary BPSK-DCM-DUP PPDU format.

FIG. 2 illustrates an exemplary frame format (PPDU format) of the BPSK-DCM. In the BPSK-DCM, two payload portions correspond to groups of the data subcarriers that have been divided into two. FIG. 3 illustrates an exemplary frame format of the BPSK-DCM-DUP. In the BPSK-DCM-DUP, the BPSK-DCM is applied to the data subcarriers in a lower half of a transmission bandwidth and duplication is performed in an upper half of the transmission bandwidth. For example, the presence or absence of the BPSK-DCM and the BPSK-DCM-DUP may be indicated to the STA in a MCS field. The MCS field may be included in a signaling field such as an Extreme High Throughput (EHT)-SIG field illustrated in FIGS. 2 and 3, for example. Meanwhile, identification information included in the MCS field (e.g., referred to as MCS index or EHT-MCS index) is undetermined (To Be Determined (TBD)) in the technical specification development of 11be.

[Non-High Throughput (HT) Duplicate]

Figure 4:
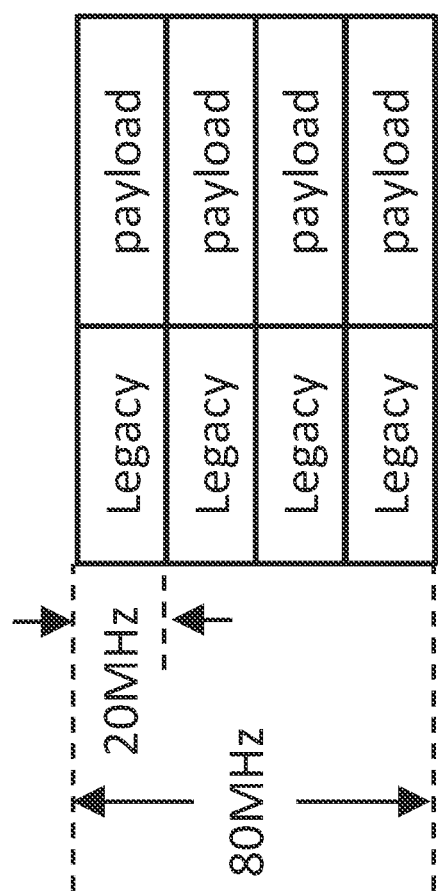
FIG. 4 illustrates an exemplary non-High Throughput (HT) PPDU format.

As with the DCM, an exemplary method to assign common data to a plurality of subchannels includes "non-HT duplicate" (see, e.g., NPL 4). FIG. 4 illustrates an exemplary frame format (PPDU format) of the non-HT duplicate. In the non-HT duplicate, for example, in the case of transmission using the BW of 40 MHz or higher (80 MHz in the example of FIG. 4), BW is divided into subchannels in a 20-MHz unit, and common data is assigned to the subchannels.

The exemplary methods to extend coverage by assigning common data to a plurality of subchannels have been each described.

However, in some cases, a gain which an LPI terminal in a 6-GHz band obtains by a method such as the DCM or the non-HT duplicate is insufficient for the coverage extension.

For example, transmission power density (Power Spectrum Density (PSD)) of the band available for an LPI terminal in a 6-GHz band is smaller than the PSD of the band available for a 5-GHz band terminal (i.e., PSD is limited). Thus, even for the LPI terminal in the 6-GHz band with which coverage tends to be narrower compared with the 5-GHz band, it is expected to achieve the coverage extension equivalent to the 5-GHz band terminal. In other words, a preferred method for the coverage extension (e.g., also referred to as mode) may vary in accordance with a communication condition such as a communication frequency band.

In an exemplary embodiment of the present disclosure, description will be given of a method of enhancing coverage and improving the communication quality in radio communication.

[Hybrid Automatic Repeat Request (HARQ)]

In 11be, for example, "HARQ" has been discussed which is a technology to improve the reception quality (or communication quality) by storing, in a buffer, a signal in which a signal error occurs and then combining the signal stored in the buffer with a retransmission signal.

In the HARQ of 11be, a retransmission method called Incremental Redundancy (IR) has been discussed, for example.

Figure 5:
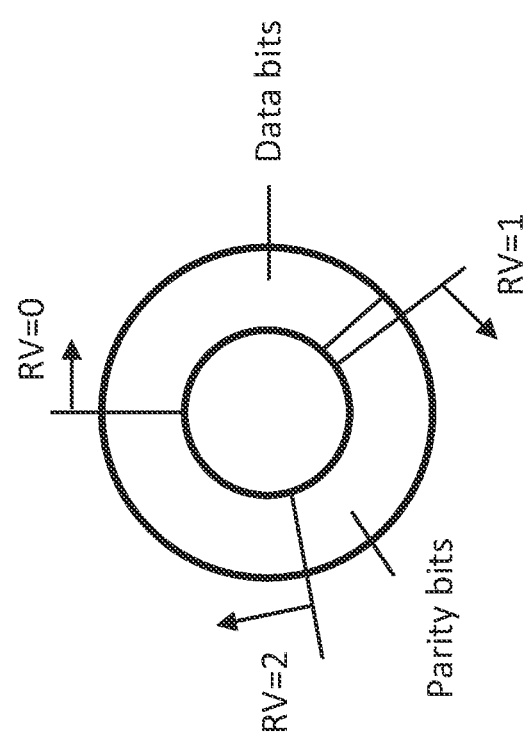
FIG. 5 illustrates an exemplary circular buffer.

FIG. 5 illustrates an exemplary circular buffer (or circulating buffer) used in the IR. The circular buffer is a buffer that includes an encoded sequence comprising encoded sequence data and parity corresponding to the encoded sequence data. Buffer indices are assigned by dividing the encoded sequence included in the circular buffer by a transmission block size. The circular buffer has a property that a buffer index returns to the top of the buffer when going beyond the end of the buffer. The IR is, for example, a method of improving the coding gain by transmitting, on a transmission side, an encoded sequence that includes a different parity bit depending on the number of times of transmission, based on a transmission start position (e.g., referred to as Redundancy version (RV)) of the encoded sequence stored in a circular buffer, and by performing, on a reception side, combination (hereinafter, referred to as "HARQ combination") (see, e.g., NPL 5). By way of example, when a signal in which a signal error occurs is retransmitted, a buffer index (e.g., RV) of the circular buffer is changed on the transmission side in order to transmit an encoded sequence that is different from the signal transmitted last time, and then the HARQ combination is performed on the reception side (i.e., when there is no signal error, no retransmission is performed and RV of circular buffer is unchanged). This processing may be repeated until there is no signal errors. Note that even when the retransmission is repeated and the encoded sequence with the same RV as that of an initial transmission is transmitted again. the coding gain is improved by time-diversity.

[Configuration of Radio Communication System]

A radio communication system according to an exemplary embodiment of the present disclosure includes at least one access point (AP which may also be referred to as a "base station") and one terminal (Station (STA)). For example, in Down Link (DL) communication, the AP corresponds to a "downlink radio transmission apparatus," and the STA corresponds to a "downlink radio reception apparatus." Moreover, in Up Link (UL) communication, the AP corresponds to an "uplink radio reception apparatus", and the STA corresponds to an "uplink radio transmission apparatus."

In an exemplary embodiment of the present disclosure, for example, a data part (e.g., Data field) of a frame (e.g., PPDU) includes a plurality of subcarrier groups (or subchannels) to which a signal generated from a common (or identical) information bit is assigned. A communication mode including such a data part is referred to as a "generalized dup mode." Further, a PPDU of the generalized dup mode is referred to as a "generalized dup mode PPDU," for example.

Thus, in the generalized dup mode, a plurality of modes may be provided for assignment of a common data signal to a plurality of subchannels arranged at least in a frequency domain.

An example of the generalized dup mode includes an "HT/non-HT dup mode," which is a mode including a non-HT duplicate PPDU common to two or more subchannels.

In addition, another example of the generalized dup mode includes an "HE dup mode," which is a mode including an HE SU PPDU or an HE Extended Range (ER) PPDU of the DCM.

Further, still another example of the generalized dup mode includes an "EHT dup mode," which is a mode including a BPSK-DCM PPDU or a BPSK-DCM-DUP PPDU. The EHT dup mode may include a plurality of modes (example will be described later) with different RV settings for a plurality of subchannels.

By way of example, the AP may transmit a generalized dup mode PPDU to STA along with control information on a generalized dup mode. The STA may identify (or determine or discriminate), based on the control information on the generalized dup mode, the generalized dup mode configured to the STA and may perform reception processing on the generalized dup mode PPDU, for example.

Hereinafter, as an example, a method in which an AP transmits a generalized dup mode PPDU to an STA in 11be will be described.

Figure 6:
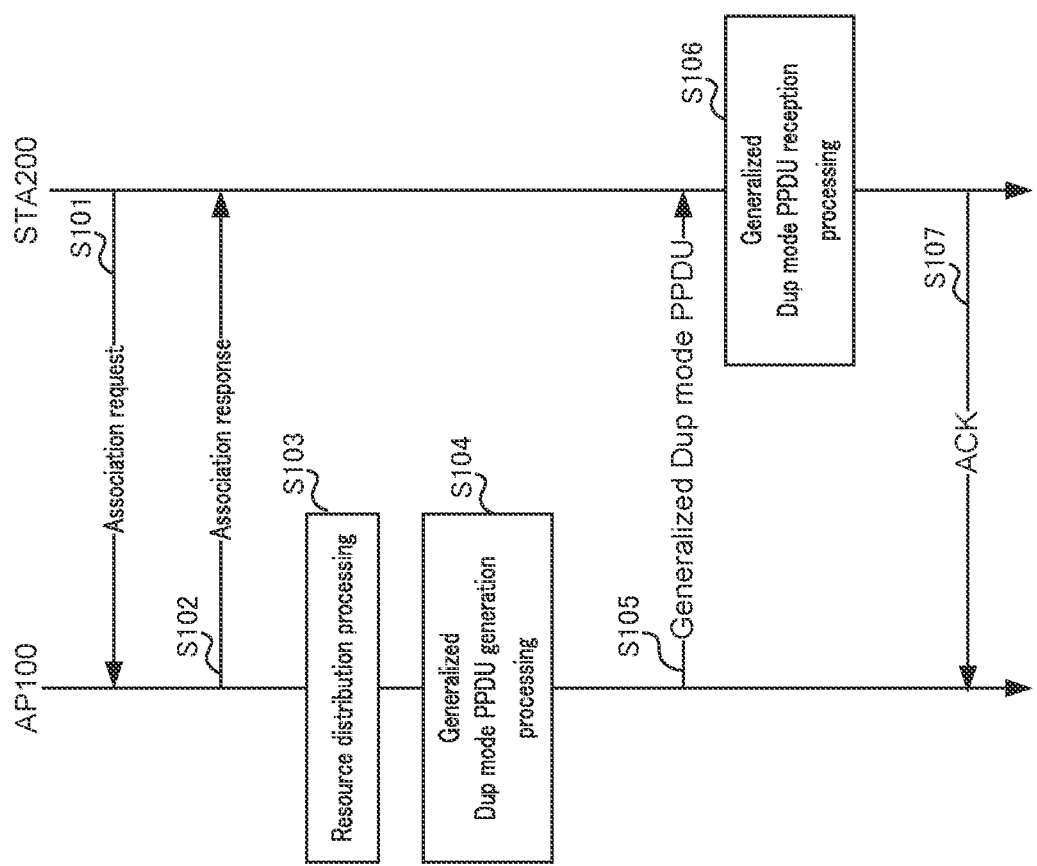
FIG. 6 is a sequence diagram describing exemplary operations an Access Point (AP) and a Station (STA)

FIG. 6 is a sequential diagram describing exemplary operations, in transmitting a generalized dup mode PPDU, of AP 100 and STA 200 of the radio communication system according to an exemplary embodiment of the present disclosure.

In FIG. 6, STA 200 transmits, to AP 100, an association request signal including capability information (e.g., referred to as Capability) on a generalized dup mode for STA 200, for example (S101). STA 200 may perform a connection request to AP 100 upon transmitting the association request signal.

AP 100 transmits, to STA 200, an association response signal for the association request signal from STA 200, for example (S102). AP 100 may allow connection of STA 200 to AP 100 by transmitting the association response signal, for example.

The signal with the capability relating to the generalized dup mode included therein and transmitted by STA 200 to AP 100 is not limited to the association request signal and may be another signal such as a beacon signal, a probe response signal, or a re-association signal.

AP 100 determines the generalized dup mode of the transmission signal addressed to STA 200, based on at least one of the capability of STA 200 and a received signal strength (e.g., referred to as Received Signal Strength Indicator (RSSI)) of the signal from STA 200, which have been obtained from this STA 200, and distributes, to each subchannel, a resource such as a frequency resource (referred to as Recourse Unit (RU)) or data subcarriers (S103), for example.

Note that the term "distribute" may be mutually replaced with other terms such as "assign" and "map" to a plurality of subchannels.

Further, AP 100 generates a generalized dup mode PPDU (S104), based on the resource information distributed to each subchannel, and transmits the generated generalized dup mode PPDU to STA 200 (S105), for example.

STA 200 performs reception processing on the generalized dup mode PPDU transmitted from AP 100, for example (S106). By way of example, STA 200 may demodulate and decode a data signal included in the generalized dup mode PPDU of each subchannel, based on a channel estimation value obtained by using the following: a reference signal (e.g., Long Training Field (LTF)) included in a preamble part of the generalized dup mode PPDU; and control information on the generalized dup mode included in the preamble part.

STA 200 generates a response signal (Acknowledge (referred to as ACK)), based on the reception processing on the data signal, and transmits the ACK (e.g., information indicating either with-error or without-error) to AP 100, for example (S107).

Thus, the exemplary operations of AP 100 and STA 200 in transmitting a generalized dup mode PPDU have been described.

Figure 7:
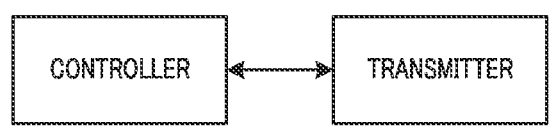
FIG. 7 is a block diagram illustrating an exemplary configuration of part of an AP according to Embodiment 1.

FIG. 7 is a block diagram illustrating an exemplary configuration of part of AP 100 according to an exemplary embodiment of the present disclosure. In AP 100 illustrated in FIG. 7 (e.g., corresponding to communication apparatus), a controller (e.g., corresponding to control circuitry) configures, for STA 200, any of a plurality of modes (e.g., generalized dup modes) relating to assignment of a common data signal to a plurality of subchannels arranged at least in a frequency domain. A transmitter (e.g., corresponding to transmitting circuitry) transmits information and a signal, the information being on the mode that has been configured for STA 200, the signal having been assigned to the plurality of subchannels.

Figure 8:
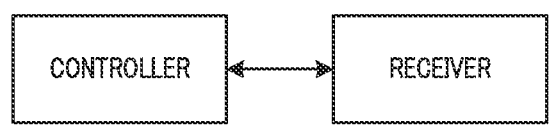
FIG. 8 is a block diagram illustrating an exemplary configuration of part of an STA according to Embodiment 1.

FIG. 8 is a block diagram illustrating an exemplary configuration of part of STA 200 according to an exemplary embodiment of the present disclosure. In STA 200 illustrated in FIG. 8 (e.g., corresponding to communication apparatus), a receiver (e.g., corresponding to reception circuitry) receives information on a mode configured for STA 200, of a plurality of modes (e.g., generalized dup modes) relating to assignment of a common data signal to a plurality of subchannels arranged at least in a frequency domain. A controller (e.g., corresponding to control circuitry) controls combination of the signal that has been assigned to the plurality of subchannels, based on the information on the mode.

[Exemplary Configuration of AP 100]

Figure 9:
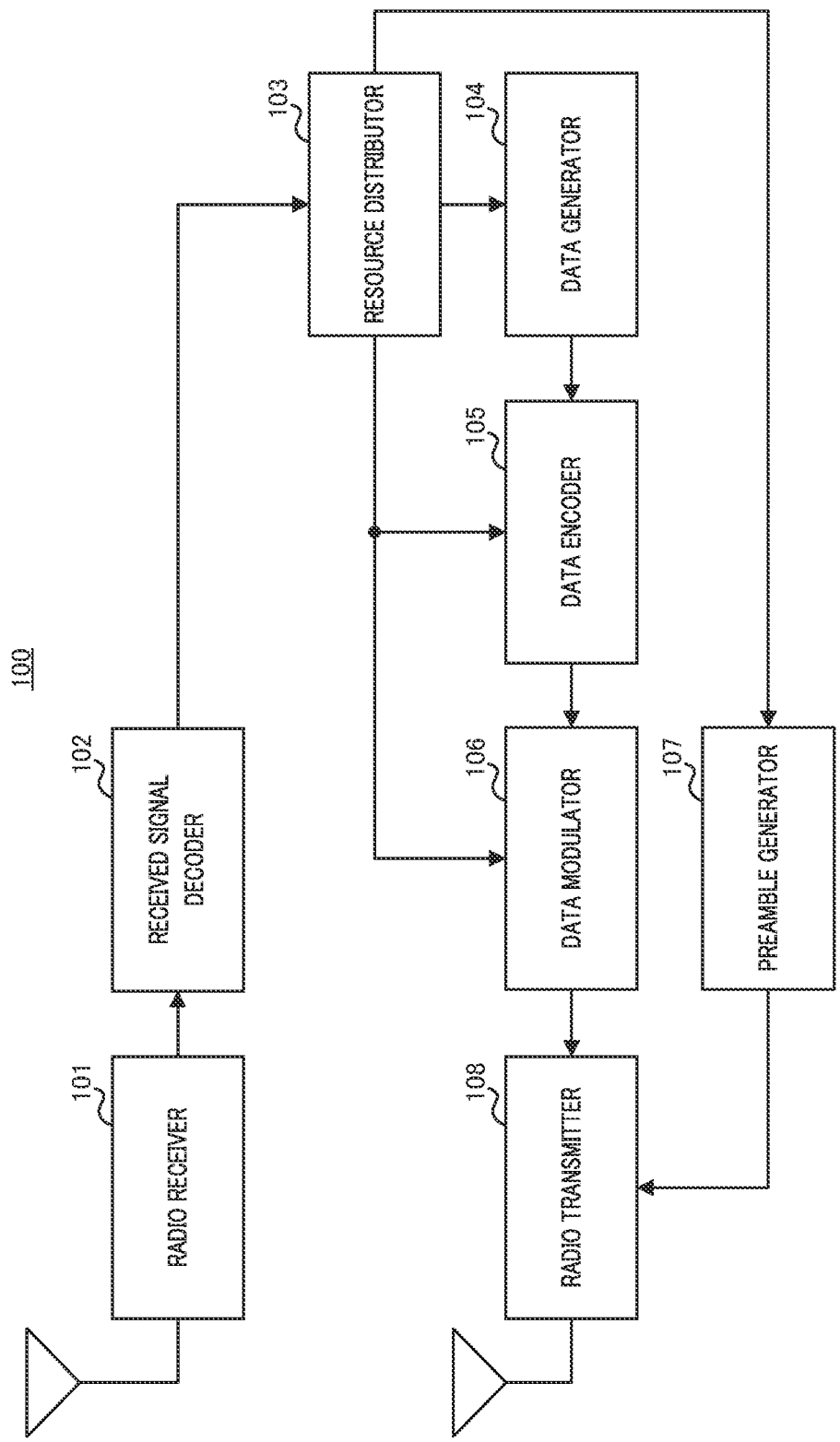
FIG. 9 is a block diagram illustrating an exemplary configuration of the AP according to Embodiment 1.
Figure 10:
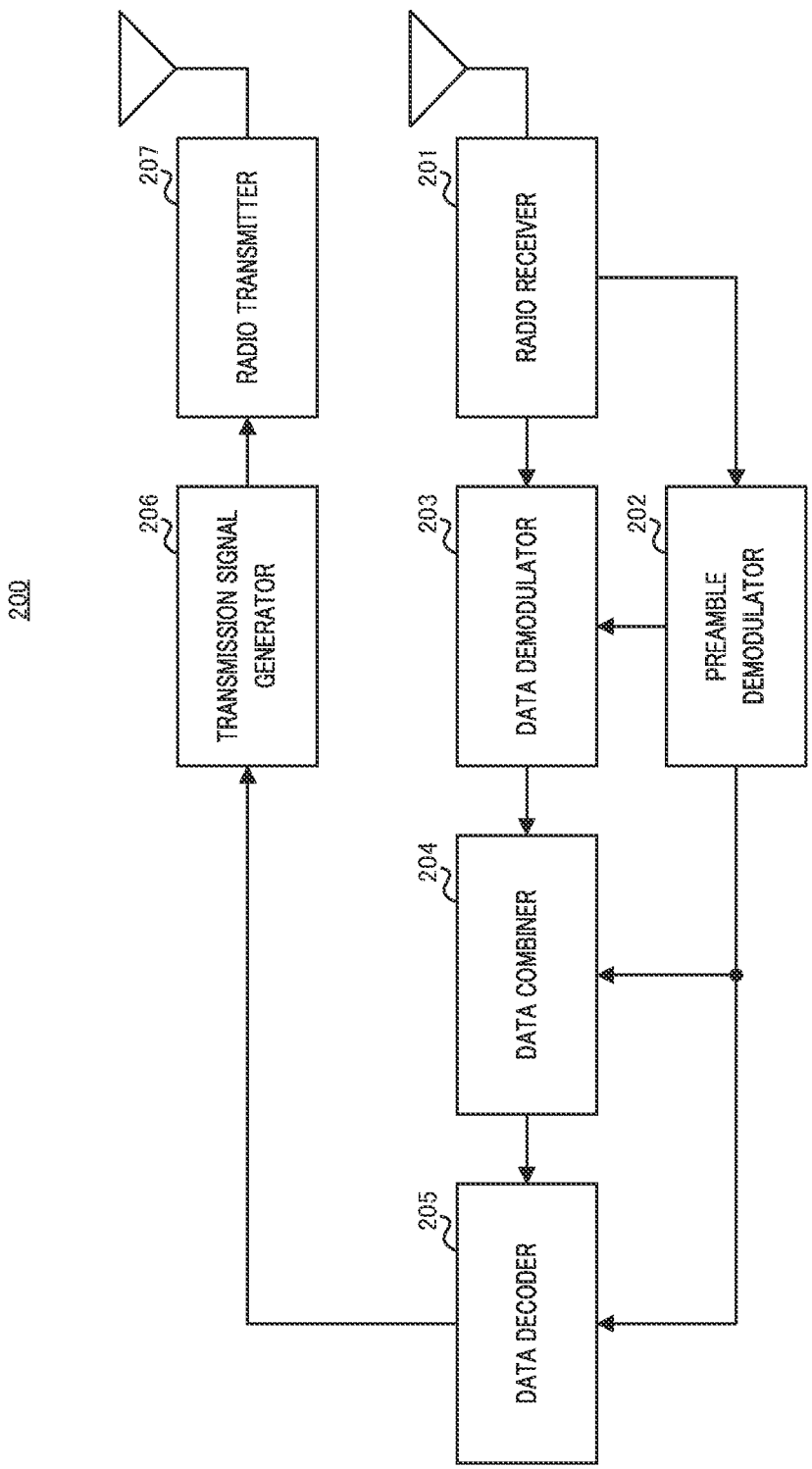
FIG. 10 is a block diagram illustrating an exemplary configuration of the STA according to Embodiment 1.

FIG. 9 is a block diagram illustrating an exemplary configuration of AP 100 (e.g., downlink radio transmission apparatus). AP 100 illustrated in FIG. 9 may include, for example, radio receiver 101, received signal decoder 102, resource distributor 103, data generator 104, data encoder 105, data modulator 106, preamble generator 107, and radio transmitter 108.

For example, at least one of received signal decoder 102, resource distributor 103, data generator 104, data encoder 105, data modulator 106, and preamble generator 107 may be included in the controller illustrated in FIG. 7, and radio transmitter 108 may be included in the transmitter illustrated in FIG. 7.

Radio receiver 101 receives a signal transmitted from STA 200 (e.g., downlink radio reception apparatus) via an antenna and performs radio reception processing such as down-conversion and Analog-to-Digital (A/D) conversion on the received signal. Radio receiver 101, for example, divides the received signal after the radio reception processing into a preamble part (may also be referred to as preamble signal) and a data part (may also be referred to as data signal) and then outputs them to received signal decoder 102.

Received signal decoder 102 may perform demodulation processing such as a Fourier transform (e.g., Fast Fourier Transform (FFT)) on each of the preamble signal and the data signal input from radio receiver 101 and thereby extract a control signal included in each of the preamble signal and the data signal, for example. The control signal may include, for example, a bandwidth (BW), an MCS, or a coding method.

In addition, for example, received signal decoder 102 may perform channel equalization, demodulation, and decoding on the data signal after FFT, by using the control signal acquired from the preamble signal and a channel estimation signal, and may thereby perform error determination such as Cyclic Redundancy Check (CRC). When the data signal includes no error (i.e., decoding error), for example, received signal decoder 102 outputs the decoded data signal and the control signal to resource distributor 103. On the other hand, when the data signal includes an error, for example, received signal decoder 102 need not output the decoded data signal.

Resource distributor 103 determines a generalized dup mode of a data signal to be transmitted to STA 200, based on reception quality information of the data signal input from received signal decoder 102 (e.g., Packet Error Rate (PER) or RSSI) or the capability of STA 200. Further, resource distributor 103 distributes (or assigns or maps), based on the determined generalized dup mode, resources such as the number of subchannels, the number of data subcarriers, and a frequency resource (e.g., RU) to subchannels, for example. Resource distributor 103 outputs information on the distributed resources (e.g., referred to as resource distribution information) to data generator 104, data encoder 105, data modulator 106, and preamble generator 107, for example.

Data generator 104 generates a data sequence to be transmitted to STA 200, based on the resource distribution information input from resource distributor 103, and outputs the data sequence to data encoder 105, for example.

Data encoder 105 divides, by each subchannel, the data sequence input from data generator 104 and the assigned data subcarriers, based on the resource distribution information (e.g., the number of divisions of data subcarriers or data subcarrier information) input from resource distributor 103, for example. Data encoder 105 then performs encoding for each subchannel and outputs the encoded data to data modulator 106, for example.

Data modulator 106 performs modulation and an inverse Fourier transform (e.g., Inverse Fast Fourier Transform (IFFT)) on the encoded data input from data encoder 105, based on the resource distribution information (e.g., modulation mapping information) input from resource distributor 103, and then outputs the data signal to radio transmitter 108, for example.

Preamble generator 107 generates a preamble signal, based on the resource distribution information input from resource distributor 103, for example. The preamble signal may include, for example, control information on the generalized dup mode (e.g., the number of divisions of data subcarriers, i.e., the number of subchannels (Number of Duplicate ($N_{dup}$) or type of generalized dup mode). For example, preamble generator 107 performs modulation and IFFT processing on the preamble signal and outputs the preamble signal to radio transmitter 108.

Radio transmitter 108 generates a radio frame (may be referred to as, e.g., "packet signal" or "packet") that includes the data signal input from data modulator 106 and the preamble signal input from preamble generator 107. Radio transmitter 108 performs radio transmission processing, such as Digital-to-Analog (D/A) conversion and up-conversion for a carrier frequency, on the generated radio frame, and transmits the signal after the radio transmission processing to STA 200 via an antenna.

<Exemplary Configuration of STA 200>

FIG. 9 is a block diagram illustrating an exemplary configuration of STA 200 (e.g., downlink radio reception apparatus). STA 200 illustrated in FIG. 9 may include, for example, radio receiver 201, preamble demodulator 202, data demodulator 203, data combiner 204, data decoder 205, transmission signal generator 206, and radio transmitter 207.

For example, at least one of preamble demodulator 202, data demodulator 203, data combiner 204, data decoder 205, and transmission signal generator 206 may be included in the controller illustrated in FIG. 8, and radio receiver 201 may be included in the receiver illustrated in FIG. 8.

Radio receiver 201 receives a signal transmitted from AP 100 via an antenna and performs radio reception processing such as down-conversion and A/D conversion on the received signal. Radio receiver 201 extracts a preamble from the signal after the radio reception processing and outputs the preamble to preamble demodulator 202. Radio receiver 201 also extracts a data signal from the signal after the radio reception processing and outputs the data signal to data demodulator 203.

Preamble demodulator 202 performs demodulation processing such as FFT on the preamble signal input from radio receiver 201 and thereby extracts, from the preamble signal after the demodulation, a control signal (e.g., BW, MCS or coding method) to be used for demodulation and decoding of the data signal, for example. Preamble demodulator 202 outputs the extracted control signal to data demodulator 203 and data decoder 205, for example. Further, preamble demodulator 202 performs a channel estimation based on a reference signal (e.g., LTF) included in the preamble signal and outputs channel estimation information to data demodulator 203, for example. Further, preamble demodulator 202 outputs control information on a generalized dup mode included in the preamble signal (e.g., the number of subchannels or type of generalized dup mode) to data combiner 204, for example.

Data demodulator 203 performs processing such as FFT, channel equalization, or demodulation on the data signal input from radio receiver 201, based on the control information and the channel estimation information input from preamble demodulator 202, and then outputs, to data combiner 204, the demodulated data signal that is addressed to STA 200.

Data combiner 204 determines whether to combine the decoded data signal input from data demodulator 203, based on the control information input from preamble demodulator 202. For example, in a case where a communication mode corresponding to the demodulated data signal is different from a generalized dup mode (in the case of non-generalized dup mode), data combiner 204 outputs, to data decoder 205, the demodulated data signal input from data demodulator 203. On the other hand, for example, in a case where a communication mode corresponding to the demodulated data signal is the same as the generalized dup mode, data combiner 204 performs data combination based on the type of generalized dup mode and then outputs the combined data to data decoder 205.

Data decoder 205 decodes the data signal input from data combiner 204, based on the control information input from preamble demodulator 202, performs an error determination such as CRC, and then outputs information indicating an error-determination result to transmission signal generator 206, for example.

Transmission signal generator 206 generates a response signal (e.g., ACK or Block ACK (BA)), based on the information indicating the error-determination result input from data decoder 205. Further, transmission signal generator 206 adds a preamble signal to a data signal (e.g., uplink data signal) so as to generate a radio frame (e.g., packet signal) and outputs the radio frame to radio transmitter 207.

Radio transmitter 207 performs radio transmission processing, such as D/A conversion and up-conversion for a carrier frequency, on the radio frame input from transmission signal generator 206, and transmits the signal after the radio transmission processing to AP 100 via an antenna.

[Exemplary Operations of AP 100 and STA 200]

Next, exemplary operations of AP 100 and STA 200 according to the present embodiment will be described.

In an exemplary embodiment of the present disclosure, a plurality of generalized dup modes configurable for STA 200 may include an EHT dup mode in which a signal (e.g., encoded sequence) corresponding to any of RVs of an error-correction code for a data signal is included in a plurality of subchannels.

By way of example, the EHT dup mode may include a mode for assigning individual RVs (e.g., different RVs) to data subcarriers (or subchannels). In other words, the EHT dup mode may include a mode in which an RV of a subchannel is changed.

In an EHT dup mode PPDU of this mode, of encoded sequence data stored in a circular buffer as in the HARQ-IR, encoded sequences with different RVs may be assigned to a plurality of subchannels.

Figure 11:
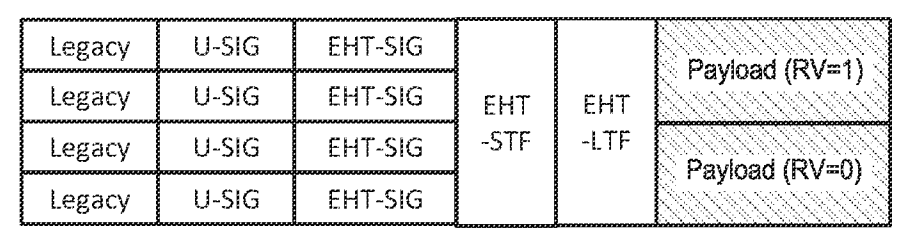

FIG. 11 illustrates an exemplary EHT dup mode PPDU format including encoded sequences with different RVs for each subchannel. In the example illustrated in FIG. 11, a plurality of data subcarriers are divided into two subchannels, and RV=0 is assigned to one subchannel, whereas RV=1 is assigned to the other subchannel. The assignment of different RVs for each subchannel allows a reception side (e.g., STA 200) to obtain a coding gain from the HARQ combination, and thus, the coverage can be improved, for example.

Note that, for example, coding rate=1/2 is usable in the BPSK-DCM and the BPSK-DCM-DUP of 11be. In this case, since a ratio of a parity bit with respect to a data bit is small, it is difficult to transmit different parity bits for each RV, which makes it difficult to obtain the coding gain from the HARQ combination.

Therefore, in an exemplary embodiment of the present disclosure, for example, a coding rate smaller than coding rate=1/2 (e.g., coding rate=1/3 or 1/4) may be set in the EHT dup mode mentioned above. Hereinafter, as an example of an error-correction code, a configuration example of an RV when using a Binary Convolutional Code (BCC) and a Low-Density Parity-Check (LDPC) will be described.

<BCC Configuration Example>

When using the BCC, for example, AP 100 may use an encoder of coding rate=1/2 so as to achieve a coding rate smaller than coding rate=1/2.

In one example, AP 100 may achieve coding rate=1/4 by encoding a data sequence twice with the encoder of coding rate=1/2.

Further, for example, AP 100 may achieve coding rate=1/3 by puncturing the encoded data bit of coding rate=1/4 generated by the twice encoding. At this time, AP 100 may change a puncturing pattern of the encoded data bit for each RV, for example. Changing the puncturing pattern makes it easier to transmit different parity bits, and thus, the coding gain from the HARQ combination can be obtained.

<LDPC Configuration Example 1>

In LDPC Configuration Example 1, for example, in the case of a mode in which encoded sequences with different RVs are respectively included in subchannels (e.g., may also be referred to as "the case with IR"), a desired (or target) coding rate is achieved by setting (i.e., changing) a length of a code word (e.g., referred to as Codeword (CW)).

FIG. 12 illustrates an exemplary case where desired coding rate=1/3.

In the LDPC, an information bit is a bit sequence including a data bit and a shortened bit, for example.

For example, as illustrated in FIG. 12, a circular buffer generated in the case of desired coding rate=1/3, based on information bit length=972 bits with coding rate=1/2, is composed of an information bit (e.g., 972 bits) and parity bits 1 and 2 (e.g., 972 bits each). As illustrated in FIG. 12, a CW length with coding rate=1/2 (e.g., the case without IR) is 1944 bits, whereas a CW length with coding rate=1/3 (e.g., the case with IR) is 2916 bits.

For example, as illustrated in FIG. 13, when specified CW length=1944 bits is used as a transmission unit, AP 100 may perform transmission while including RV=0 (e.g., information bit and parity bit 1) in subchannel 1 and including RV=1 (e.g., information bit and parity bit 2) in subchannel 2. In this case, a common information bit is transmitted in the plurality of subchannels, and thus, a gain from the DCM can be obtained. In addition, since the different RVs are transmitted in the plurality of subchannels, a gain from the HARQ combination can be obtained.

Similarly, for example, a circular buffer generated in the case of desired coding rate=1/4, based on information bit length=972 bits with coding rate=1/2, is composed of an information bit (e.g., 972 bits) and parity bits 1, 2, and 3 (e.g., 972 bits each). In this case, for example, a CW length with coding rate=1/2 (e.g., the case without IR) is 1944 bits, whereas a CW length with coding rate=1/4 (e.g., the case with IR) is 3888 bits. At this time, for example, as illustrated in FIG. 14, when specified CW length=1944 bits is to be a transmission unit. AP 100 may perform transmission while including RV=0 (e.g., information bit and parity 1) in subchannel 1 and including RV=1 (e.g., parity 2 and parity 3) in subchannel 2. In addition, since the different RVs are transmitted in the plurality of subchannels, a gain from the HARQ combination can be obtained.

<LDPC Configuration Example 2>

In LDPC Configuration Example 2, for example, in the case of a mode in which encoded sequences with different RVs are respectively included in subchannels (the case with IR), a desired coding rate is achieved by setting a length of an information bit.

FIG. 15 illustrates an exemplary case where a desired coding rate is 1/3.

For example, as illustrated in FIG. 15, a circular buffer generated in the case of desired coding rate=1/3, based on information bit length=972 bits with coding rate=1/2, is composed of an information bit (e.g., 648 bits) and parity bits 1 and 2 (e.g., 648 bits each). As illustrated in FIG. 15, an information-bit length with coding rate=1/2 (e.g., the case without IR) is 972 bits, whereas an information-bit length with coding rate=1/3 (e.g., the case with IR) is 648 bits.

In LDPC Configuration Example 2, a CW length is identical between the case with IR and the case without IR, as illustrated in FIG. 15.

For example, as illustrated in FIG. 16, when a specified CW length (e.g., 1296 bits) is used as a transmission unit, AP 100 may perform transmission while including RV=0 (e.g., information bit and parity bit 1) in subchannel 1 and including RV=1 (e.g., information bit and parity bit 2) in subchannel 2. In this case, a common information bit is transmitted in the plurality of channels, and thus, a gain from the DCM can be obtained. In addition, since the different RVs are transmitted in the plurality of subchannels, a gain from the HARQ combination can be obtained.

Similarly, for example, a circular buffer generated in the case of desired coding rate=1/4, based on information bit length=972 bits with coding rate=1/2, is composed of an information bit (e.g., 486 bits) and parity bits 1, 2, and 3 (e.g., 486 bits each). At this time, for example, as illustrated in FIG. 17, when a specified CW length (e.g., 1296 bits) is to be a transmission unit, AP 100 may perform transmission while including RV=0 (e.g., information bit and parity bits 1 and 2) in subchannel 1 and including RV=1 (e.g., information bit and parities 1 and 3) in subchannel 2. In this case, a common information bit is transmitted in the plurality of subchannels, and thus, a gain from the DCM can be obtained. In addition, since the different RVs are transmitted in the plurality of subchannels, a gain from the HARQ combination can be obtained.

<LDPC Configuration Example 3>

In LDPC Configuration Example 3, for example, in the case of a mode in which encoded sequences with different RVs are respectively included in subchannels, a desired coding rate is achieved by setting (i.e., changing) a length of a data bit.

Figure 18:
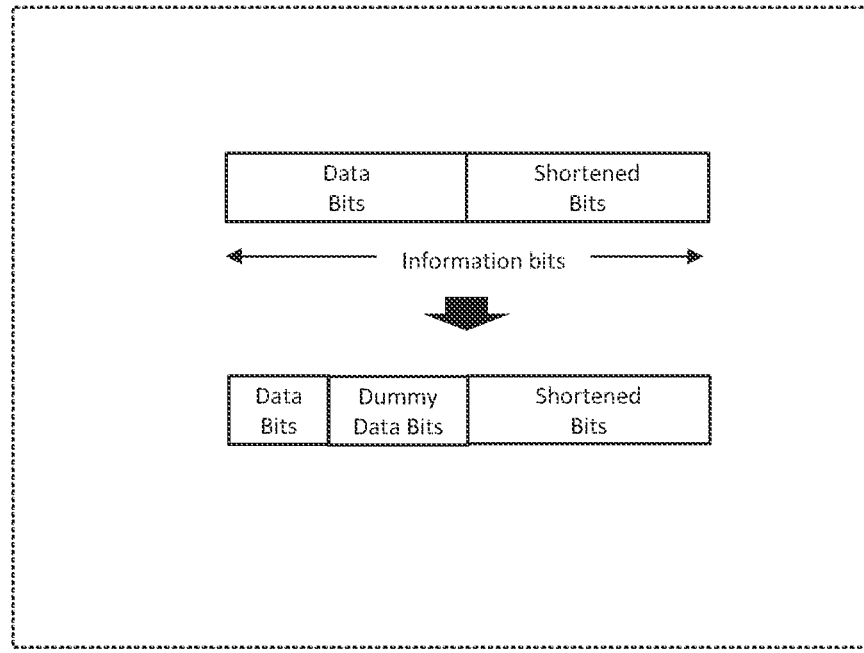
FIG. 18 illustrates an exemplary setting of a coding rate according to LDPC Configuration Example 3.

FIG. 18 illustrates an exemplary setting of a data-bit length.

As illustrated in FIG. 18, a dummy data bit may be used to reduce a substantial data bit included in information bits. For example, all bits of the dummy data bits may be zero.

For example, when CW length=1944 bits, a circular buffer obtained by a generator polynomial with coding rate=1/2 is composed of information bits=972 bits and parity bits=972 bits. Then, when a desired coding rate is 1/4, for example, data bits included in the information bits may be set to 324 bits. For example, when a desired coding rate is 1/4, a circular buffer obtained by a generator polynomial with coding rate=1/2 may be composed of an information bit (e.g., 972 bits (data bit (324 bits)+dummy data bit (648) bits)) and parity bits 1, 2, and 3 (e.g., 324 bits each). Note that the dummy data bit need not be included in an encoded sequence for each RV included in a subchannel.

Thus, in LDPC Configuration Example 3, a desired coding rate is achieved by changing a data-bit length in an information bit in the case with IR, with respect to a data-bit length in an information bit in the case without IR.

Figure 19:
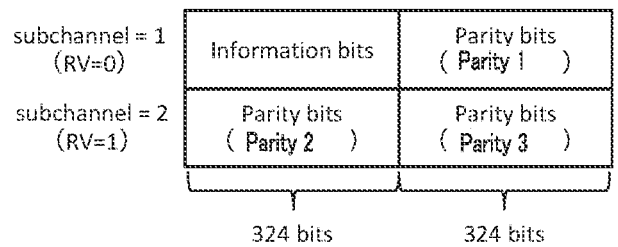
FIG. 19 illustrates an exemplary configuration of an RV according to LDPC Configuration Example 3.

For example, as illustrated in FIG. 19, when specified CW length=648 bits is used as be a transmission unit, AP 100 may perform transmission while including RV=0 (e.g., information bit and parity bit 1) in subchannel 1 and including RV=1 (e.g., parity bits 2 and 3) in subchannel 2.

In this case, since the different RVs are transmitted in the plurality of subchannels, a gain from the HARQ combination can be obtained.

The RV configuration examples have been each described, thus far.

Next, descriptions will be given of exemplary modes (e.g., Examples 1 to 3) in which encoded sequences with different RVs are respectively included in subchannels.

Example 1

An EHT dup mode may include, for example, a mode in which both modulation mapping and RVs for signals (e.g., encoded sequences) to be assigned to two or more subchannels are different (hereinafter referred to as "EHT dup mode (DCM+IR)"). In other words, the EHT dup mode may include a mode in which DCM of the BPSK-DCM or the BPSK-DCM-DUP is changed into DCM and IR (e.g., DCM+IR).

In the EHT dup mode (DCM+IR), for example, in a plurality of subchannels, different modulation mapping is performed on encoded sequences that are at least partly common to each other. Also, in the EHT dup mode (DCM+IR), for example, encoded sequences with different RVs are respectively included in the plurality of subchannels.

Figure 20:
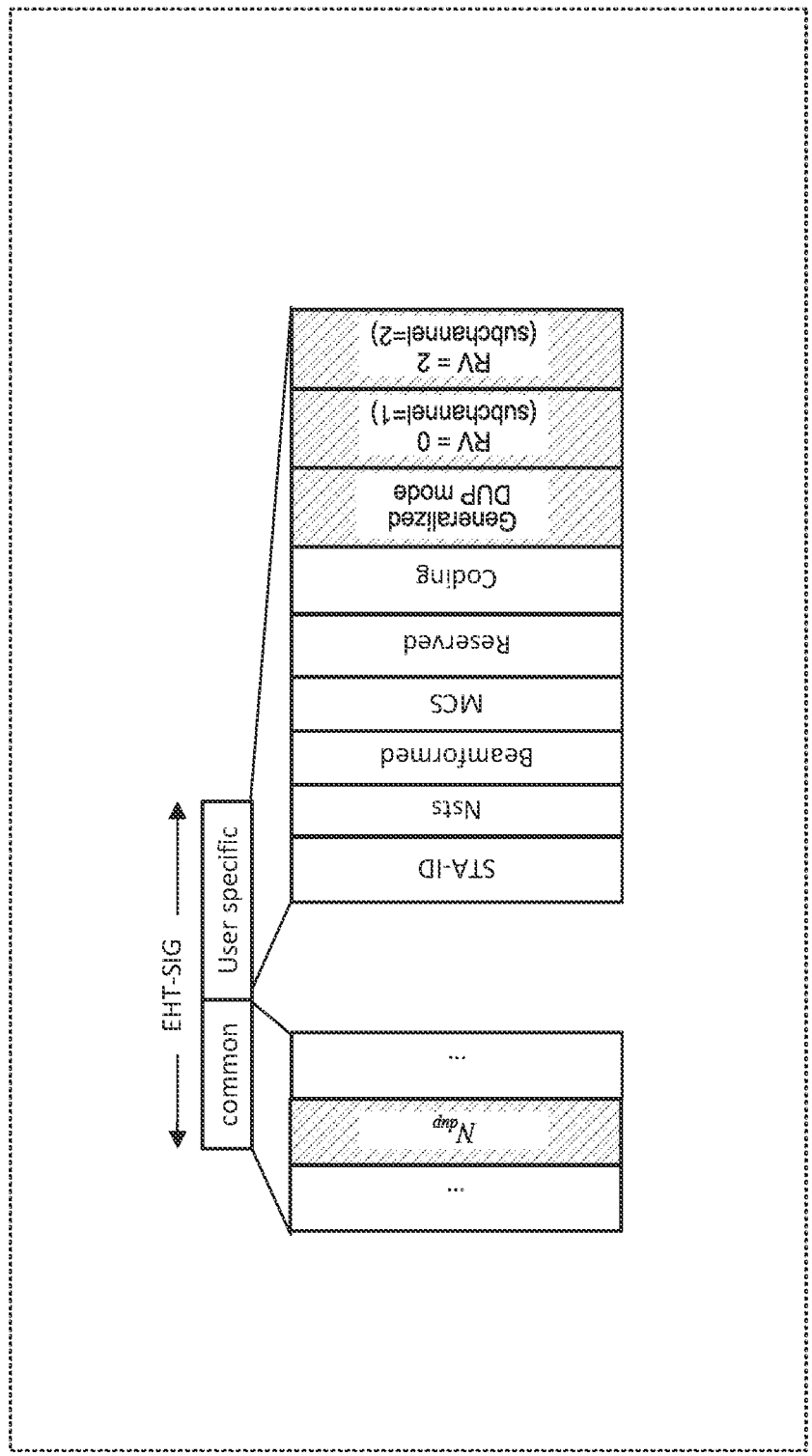
FIG. 20 illustrates an exemplary Extreme High Throughput (EHT) SIG field according to Example 1.

FIG. 20 illustrates an exemplary EHT-SIG including control information on the EHT dup mode (DCM+IR) in Example 1.

AP 100 may indicate, for example, control information on the EHT dup mode (DCM+IR) to STA 200, as illustrated in FIG. 20. The control information on the EHT dup mode (DCM+IR) may include, for example, information (e.g., generalized DUP mode) indicating the number of divisions of data sub-carriers (e.g., the number of subchannels (Number of Duplicate ($N_{dup}$))) and the type of generalized dup mode (here, EHT dup mode (DCM+IR)), and information indicating an RV for each subchannel.

In FIG. 20, as an example, a case is illustrated where the number of subchannels, $N_{dup}$, is included in a common field shared by a plurality of users (STAs), whereas the generalized dup mode and the RVs are included in a User specific field specific to each user (STA). However, fields which include the control information are not limited to these, and the control information may be included in at least one of the common field and the User specific field, or in other fields.

In the example illustrated in FIG. 20, an encoded sequence with RV=0 included in subchannel 1, and an encoded sequence with RV=2 included in subchannel 2 are at least partly common. For example, subchannel 1 and subchannel 2 may have common encoded data bits and different parity bits.

The EHT dup mode (DCM+IR) makes it possible to, for example, obtain a frequency diversity gain from the transmission of data at least partly common, with different modulation mapping for each subchannel, and a coding gain from the HARQ combination (transmission of RV different for each subchannel).

Example 2

An EHT dup mode may include, for example, a mode in which RVs are different in two or more subchannels (hereinafter referred to as "EHT dup mode (IR)"). In other words, the EHT dup mode may include a mode DCM of the BPSK-DCM or the BPSK-DCM-DUP is changed into the IR.

In the EHT dup mode (IR), for example, encoded sequences with different RVs are respectively included in the plurality of subchannels. Further, in the EHT dup mode (IR), for example, different modulation mapping need not be performed in the plurality of subchannels.

Figure 21:
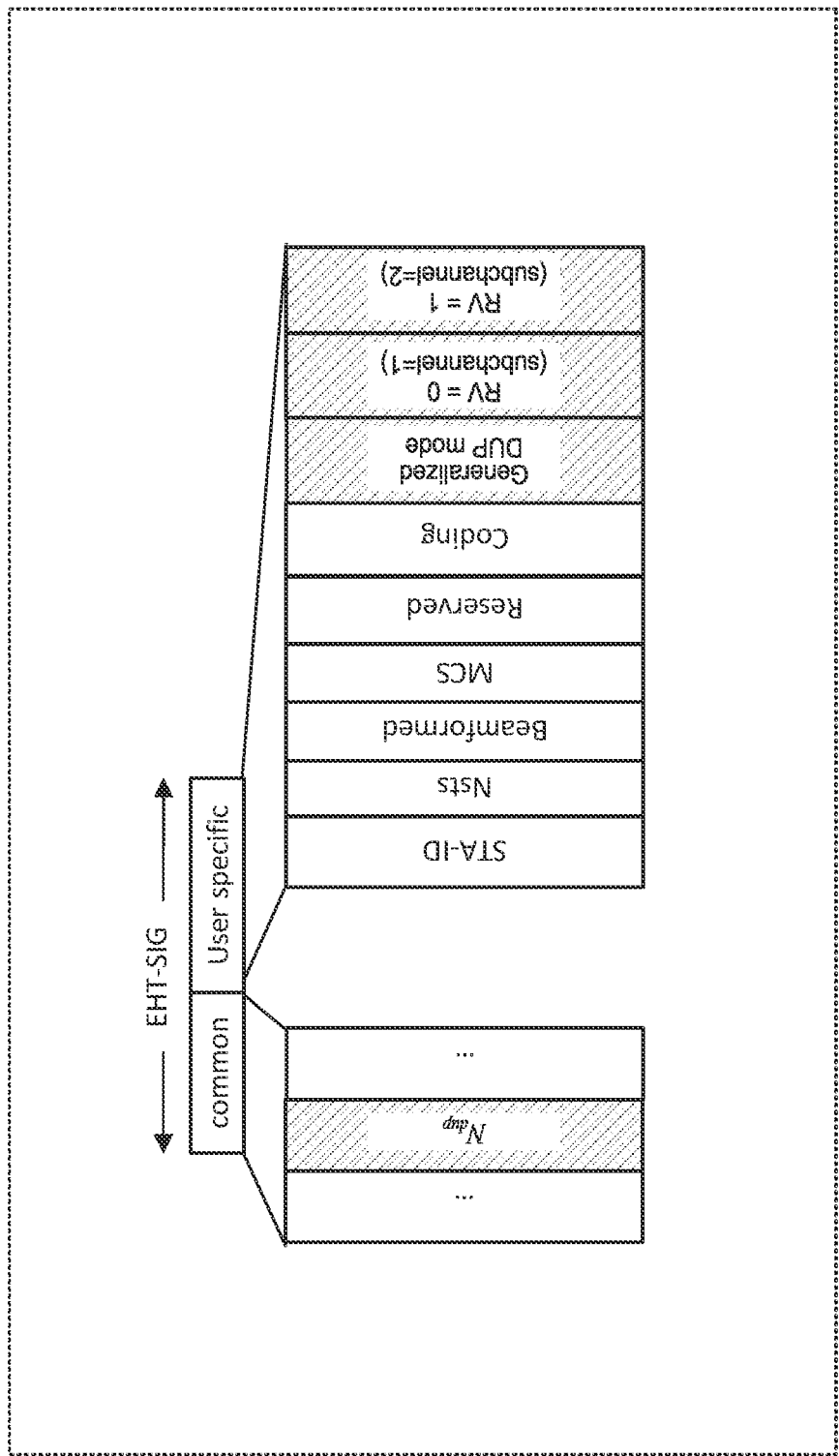
FIG. 21 illustrates an exemplary EHT SIG field according to Example 2.

FIG. 21 illustrates an exemplary EHT-SIG including control information on the EHT dup mode (IR) in Example 2.

AP 100 may indicate, for example, control information on the EHT dup mode (IR) to STA 200, as illustrated in FIG. 21. The control information on the EHT dup mode (IR) may include, for example, information (generalized DUP mode) indicating the number of subchannels, $N_{dup}$, and the type of generalized dup mode (here, EHT dup mode (IR)), and information indicating an RV for each subchannel.

In FIG. 21, as an example, a case is illustrated where the number of subchannels, $N_{dup}$, is included in a common field, whereas the generalized dup mode and the RVs are included in a User specific field, but fields which include the control information are not limited to these, and the control information may be included in at least one of the common field and the User specific field, or in other fields.

In the example illustrated in FIG. 21, an encoded sequence with RV=0 included in subchannel 1, and an encoded sequence with RV=1 included in subchannel 2 are different from each other.

The EHT dup mode (IR) makes it possible to, for example, obtain a frequency diversity gain from the transmission of an RV of encoded sequence data for each subchannel, and a coding gain from the HARQ combination.

Example 3

An EHT dup mode may include, for example, a mode that includes two or more subchannels to which signals (e.g., encoded sequences) with different RVs are assigned, in a time domain (or may also be referred to as time direction) (hereinafter referred to as "EHT dup mode (Time dup)").

In the EHT dup mode (Time dup), for example, of a plurality of subchannels arranged in a frequency domain (or may also be referred to as frequency direction) and a time domain. RVs may be different between subchannels at least in the time domain. For example, in the EHT dup mode (Time dup) encoded sequences with different RVs may be included in the plurality of subchannels with different frequency domains and time domains.

Figure 22:
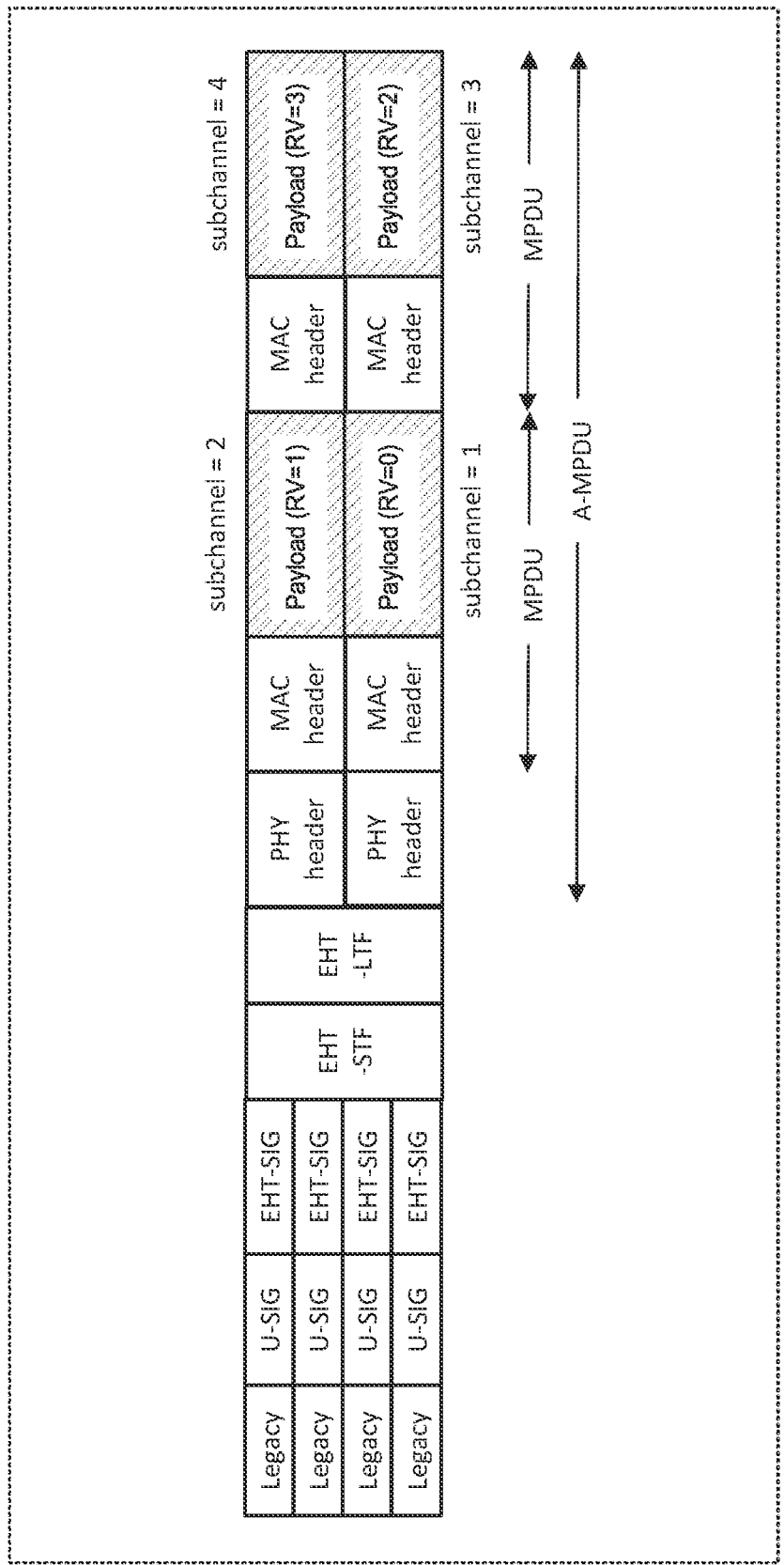
FIG. 22 illustrates an exemplary PPDU format of an EHT dup mode (Time dup) according to Example 3.

FIG. 22 illustrates an exemplary frame format (e.g., PPDU format) of the EHT dup mode (Time dup). Further, FIG. 23 illustrates an exemplary EHT-SIG including control information on the EHT dup mode (Time dup).

Figure 23:
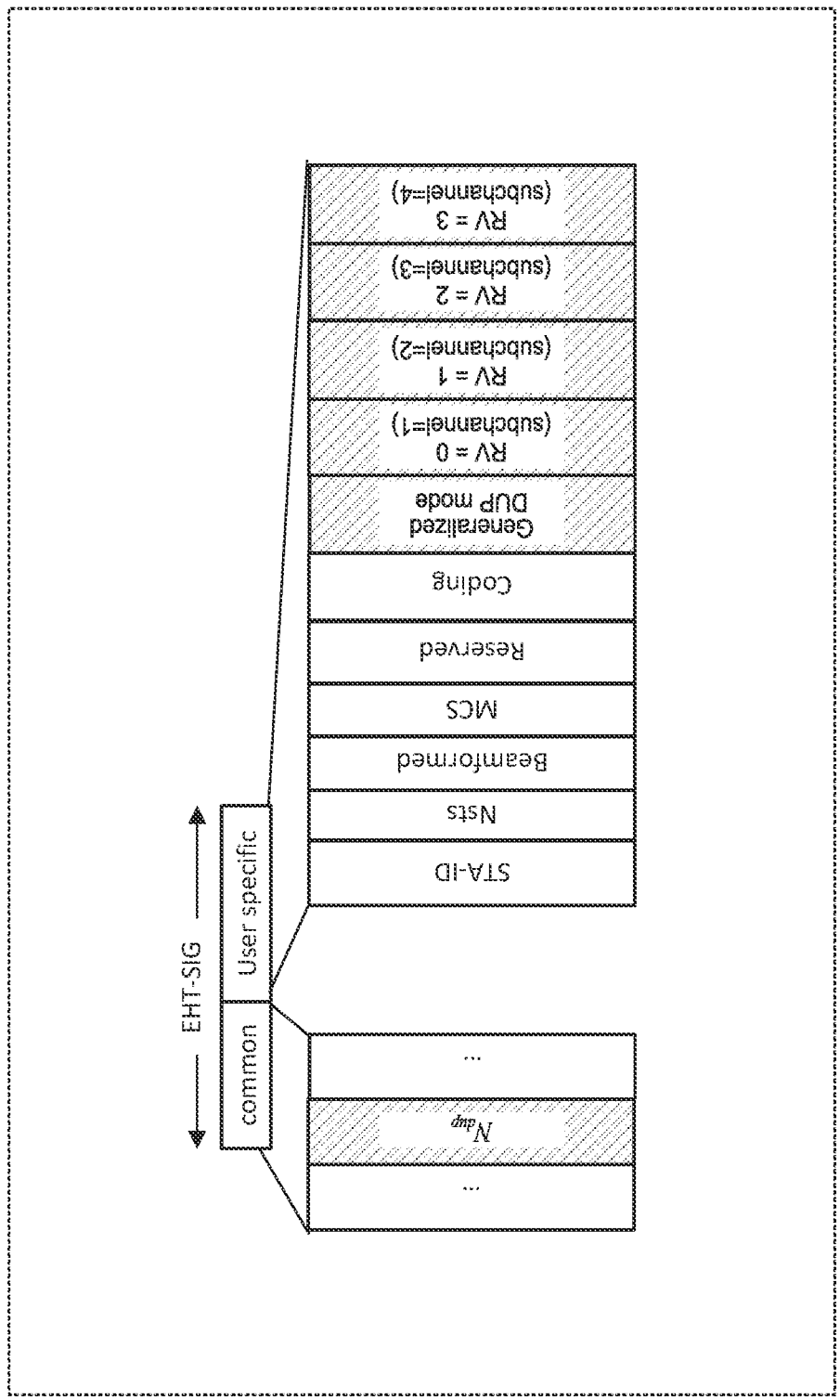
FIG. 23 illustrates an exemplary EHT SIG field according to Example 3.

AP 100 may indicate, for example, control information on the EHT dup mode (Time dup) to STA 200, as illustrated in FIG. 23. The information on the EHT dup mode (Time dup) may include, for example, information (generalized DUP mode) indicating the number of subchannels, $N_{dup}$, and the type of generalized dup mode (here, EHT dup mode (IR)), and information indicating an RV for each subchannel.

In FIG. 23, as an example, a case is illustrated where the number of subchannels, $N_{dup}$, is included in a common field, whereas the generalized dup mode and the RVs are included in a User specific field, but fields which include the control information are not limited to these, and the control information may be included in at least one of the common field and the User specific field, or in other fields.

In the EHT dup mode (Time dup), for example, an RV may be changed for each MAC Service Data Unit (MPDU), as illustrated in FIG. 22. STA 200 may identify, with reference to an MAC header of each MPDU included in a received signal, an RV included in the MPDU corresponding to the MAC header when a common sequence number is included, as an encoded sequence with an RV referring to a common (e.g., identical) circular buffer, for example.

Meanwhile, for example, part of an encoded sequence (e.g., MPDU or CW which are retransmission units in HARQ) may be included in a subchannel different in time domain and the rest of the encoded sequence may be included a subchannel common in time domain (e.g., subchannel different in frequency domain).

The EHT dup mode (Time dup) makes it possible to transmit encoded sequences with different RVs are transmitted to a time domain in addition to a frequency domain, and thus, the number of transmittable encoded sequences used for the HARQ combination can be increased, which improves the coding gain.

As for the frequency domain in Example 3, an assignment example of an encoded sequence with an RV in Example 1 or Example 2 may be applied, for example.

The exemplary modes in which encoded sequences with different RVs are included in the subchannels have been each described, thus far.

Note that a method of indicating the control information on the generalized dup mode is not limited to the exemplary indication by the ETH-SIG in any of Examples 1 to 3 mentioned above. In the following, other exemplary methods of indicating the control information on the generalized dup mode will be described.

<Method 1>

In Method 1, part of user information (e.g., information on User specific field) is replaced with control information on a generalized dup mode.

Figure 24:
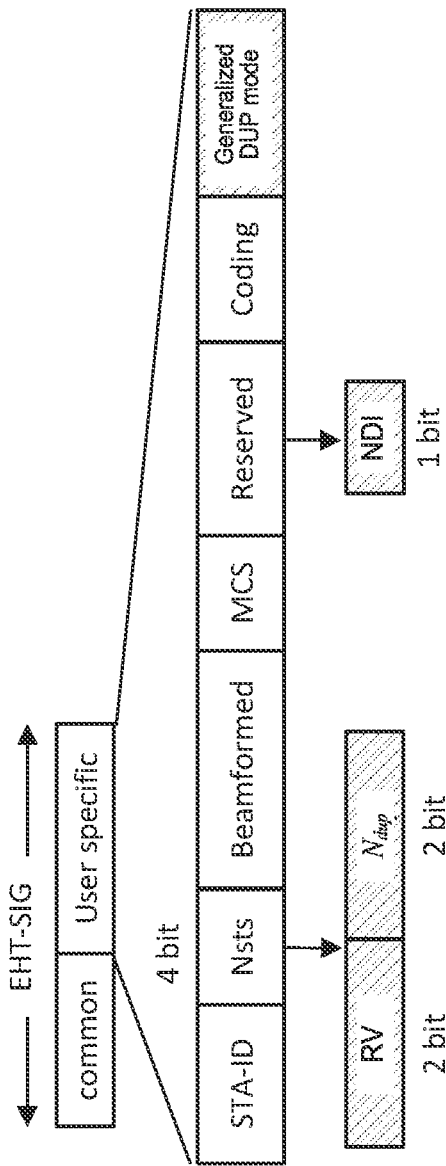
FIG. 24 is a sequence diagram illustrating an exemplary EHT SIG field according to Method 1.

FIG. 24 illustrates an exemplary ETH-SIG in Method 1.

For example, in the BPSK-DCM and the BPSK-DCM-DUP of 11be, the number of spatial streams is set (i.e., limited) to one. Thus, for example, in the BPSK-DCM and the BPSK-DCM-DUP, since the fixed number of spatial streams is set for STA 200, control information on the number of spatial streams need not be indicated to STA 200. Therefore, as illustrated in FIG. 24, part of user information may be replaced with the control information on the generalized dup mode, based on the type of generalized dup mode (e.g., DCM+IR, IR, or Time dup).

For example, as illustrated in FIG. 24, AP 100 and STA 200 may, in the EHT dup mode, replace a Number of Space-Time Streams subfield ($N_{sts}$) (e.g., four bits), which is included in a User specific field of an EHT-SIG, with an RV (e.g., two bits) of the number of subchannels, $N_{dup}$, (e.g., two bits) and some subchannels (e.g., subchannel 1).

Further, for example, as illustrated in FIG. 24, AP 100 and STA 200 may, in the EHT dup mode, replace a Reserved subfield of the EHT-SIG with a retransmission identifier (referred to as New Data Indicator (NDI)) (e.g., one bit). In other words, STA 200 may receive information on a generalized dup mode in at least a portion of a field (in FIG. 24, $N_{sts}$ or Reserved field) for information different from the information on the generalized dup mode, of the User specific field (terminal-specific control field).

For example, in FIG. 24, when the EHT dup mode is indicated by the generalized dup mode, STA 200 may determine a combination of RVs (hereinafter may also be referred to as RV combination) of the subchannels, based on an RV and the number of subchannels, $N_{dup}$, of subchannel 1 included in an $N_{sts}$ field, a retransmission identifier NDI included in a Reserved field, and a length of a circular buffer obtained by the decoding processing.

For example, as illustrated in FIG. 25, STA 200 determines the RV combinations of the subchannels based on indication information from AP 100, such as the control information on the generalized dup mode and the length of the circular buffer. In one example, in FIG. 25, STA 200 may identify RVs of subchannels 2 to 4 different from and other than subchannel 1, based on the indication information. In FIG. 25, L represents a circular buffer length, $N_{rv}$ represents the number of RVs included in the circular buffer.

Method 1 enables AP 100 to indicate, to STA 200, the control information on the generalized dup mode without additional signaling, and thus, an increase in signaling overhead can be suppressed.

In FIG. 24, an example has been described in which the $N_{sts}$ field includes the RV, the number of subchannels, and $N_{dup}$, and the Reserved field includes the NDI, but the control information on the generalized dup mode included in the $N_{sts}$ field and the Reserved field is not limited to this example. Moreover, the field for indicating the control information on the generalized dup mode is not limited to the Na field and the Reserved field, and may be other fields.

<Method 2>

In Method 2, control information on a generalized dup mode is indicated to STA 200, in conjunction with the MCS.

FIG. 26 illustrates an example of information indicating an association between an MCS index (e.g., EHT MCS index) and a combination of control information (e.g., control information on generalized dup mode is included) according to Method 2. FIG. 26 illustrates an example in which the association is expressed in a table format (MCS Table), for example.

The MCS Table illustrated in FIG. 26 may include, as a candidate for the Modulation, the control information on the generalized dup mode, such as the type of generalized dup mode (Modulation), a coding rate, the number of subchannels ($N_{dup}$), and RV combination patterns of subchannels, for example. Incidentally, the MCS Table may include, as a candidate for the Modulation, a modulation scheme candidate such as BPSK, Quadrature Phase Shift Keying (QPSK), 16-Quadrature Amplitude Modulation (QAM), 64-QAM, 256-QAM, 1024-QAM, or 4096-QAM (not illustrated). In other words, each of the plurality of candidates including a modulation scheme for a data signal and a plurality of generalized dup modes (e.g., BPSK-DCM and BPSK-DCM-DUP) may be associated with an MCS Index (identification information).

The MCS index to be associated with the generalized dup mode may be any value (in FIG. 26, represented by To be determined (TBD)). For example, a 4-bit MCS index as in 11ax may be used to indicate respective modes of the generalized dup mode by some of MCS 12 to MCS 15, which are unused in 11ax, or the MCS index may be extended to 5 bits or more to indicate respective modes of the generalized dup mode by an index of 16 or more. Further, the generalized dup modes included in the MCS Table is not limited to the example illustrated in FIG. 26, and another generalized dup mode may be included or a combination of other generalized dup modes is possible.

For example, STA 200 may receive an MCS index indicated from AP 100 and determine, with reference to the MCS Table illustrated in FIG. 26 based on the received MCS index, the type of generalized dup mode, the number of subchannels, $N_{dup}$, and the RV of each subchannel.

Method 2 enables AP 100 to indicate, to STA 200, the control information on the generalized dup mode by using the MCS table even when the number of spatial streams of DCM is not set to one, for example. Hence, AP 100 can indicate, to STA 200, the control information on the generalized dup mode without additional signaling, and thus, an increase in signaling overhead can be suppressed.

The exemplary methods of indicating the control information on the generalized dup mode have been each described, thus far.

In the manner described above, in the present embodiment, STA 200 receives, among a plurality of generalized dup modes, control information on a generalized dup mode to be configured for STA 200 and controls combination of a signal assigned to a plurality of subchannels, based on information on the received generalized dup mode.

This control enables STA 200 to, for example, perform communication by switching an expected method (e.g., generalized dup mode) for the coverage extension, in accordance with a communication condition such as a communication frequency band. STA 200 can also improve the coverage by a frequency diversity gain or a coding gain from the generalized dup mode, by individually setting RVs for subchannels in the generalized dup mode. Thus, for example, even in a frequency band available for an LPI terminal in a 6-GHz band with which coverage tends to be narrower compared with a 5-GHz band terminal (or, frequency band where transmission power density may be limited), it is expected to achieve the coverage extension equivalent to the 5-GHz band.

Therefore, according to the present embodiment, it is possible to improve the communication quality in radio communication.

The embodiment of the present disclosure has been described, thus far.

Other Embodiments

1. For example, in 11be, the DCM is configured (i.e., limited) for an SU, but a generalized dup mode according to an exemplary embodiment of the present disclosure may be applied to, for example, multi-user transmission (Multi-User Multiple-Input Multiple-Output (MU-MIMO)) or Orthogonal Frequency-Division Multiple Accuses (OFDMA) without limited to the SU.

2. A modulation method, a coding rate, and the number of spatial streams used in the above-mentioned embodiment are merely examples and are not limited to these examples, and may be set to other values.

3. A retransmission unit in the above-mentioned embodiment may be either an MPDU or a CW or may be other transmission units.

4. While a method of indicating an RV for each subchannel has been described in the above-mentioned embodiment, an RV to be included in a generalized dup mode PPDU for an initial transmission (e.g., when NDI is zero) may be fixed for each subchannel, for example.

By way of example, in the generalized dup mode PPDU for the initial transmission, an encoded sequence with RV=0 for subcarrier 1 and an encoded sequence with RV=1 for subcarrier 2 may be fixedly included. Hence, for example, control information on an RV for each subchannel need not be included in the generalized dup mode PPDU for the initial transmission. This can reduce signaling relating to the RV and thus improve overhead.

5. In the above-mentioned embodiment, a Midamble may be included in a data part, for example. The Midamble enables adaptation to a fast fading environment, for example.

Figure 27:
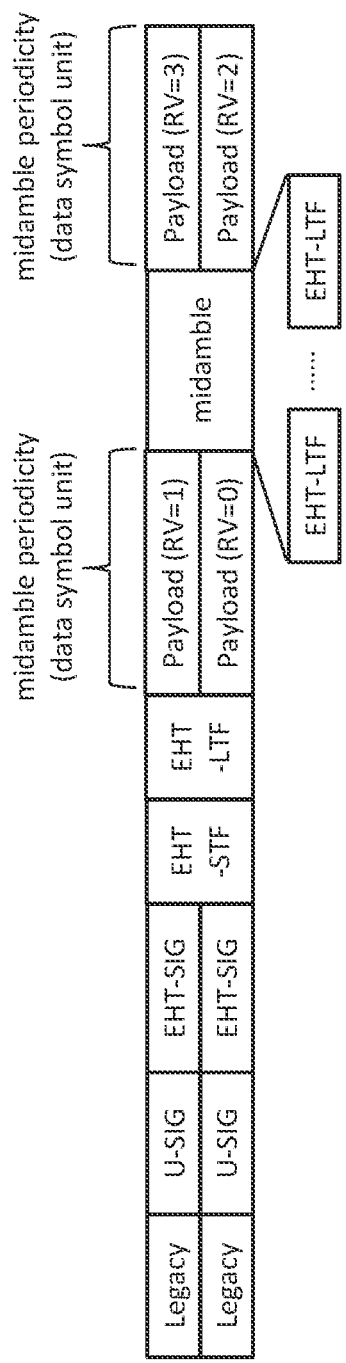
FIG. 27 illustrates an exemplary PPDU format according to another embodiment.

FIG. 27 illustrates an exemplary frame format (e.g., PPDU format) of a case where the Midamble (e.g., EHT- LTF) is included. For example, as in 11ax, AP 100 may indicate, to STA 200, whether the Midamble is included in a data part in a Doppler field included in a preamble part.

Further, AP 100 may change an RV of the data part before and after the Midamble, for example.

Meanwhile, for example, when Doppler field=1 is included in a preamble part of a received signal, STA 200 may replace at least a portion of the Nm included in a User specific field of an EHT-SIG with periodicity of the Midamble. For example, as in 11ax, STA 200 may replace the least significant bit of $N_{sts}$ with the periodicity of the Midamble (referred to as Midamble periodicity). In one example, when the least significant bit of $N_{sts}$=0, STA 200 may replace the bit with Midamble periodicity=10 data symbols, and when the least significant bit of $N_{sts}$=1, STA 200 may replace the bit with Midamble periodicity=20 data symbols.

STA 200 can obtain a channel estimation value that follows a fast fading variation by using a reference signal (e.g., LTF) included in the Midamble, for example.

Further, for example, in Example 3 mentioned above, the midamble may be included between subchannels in time domains with different RVs. In this case, AP 100 may indicate the presence or absence of Midamble by a Doppler field, for example. Further, in this case, STA 200 need not replace a portion of $N_{sts}$ with the Midamble periodicity.

6. In the above-mentioned embodiment, the size of RU to which a transmission signal is assigned is not limited. Further, for example, a plurality of RUs may be allocated to one STA 200 (e.g., referred to as "Multi-RU").

Figure 28:
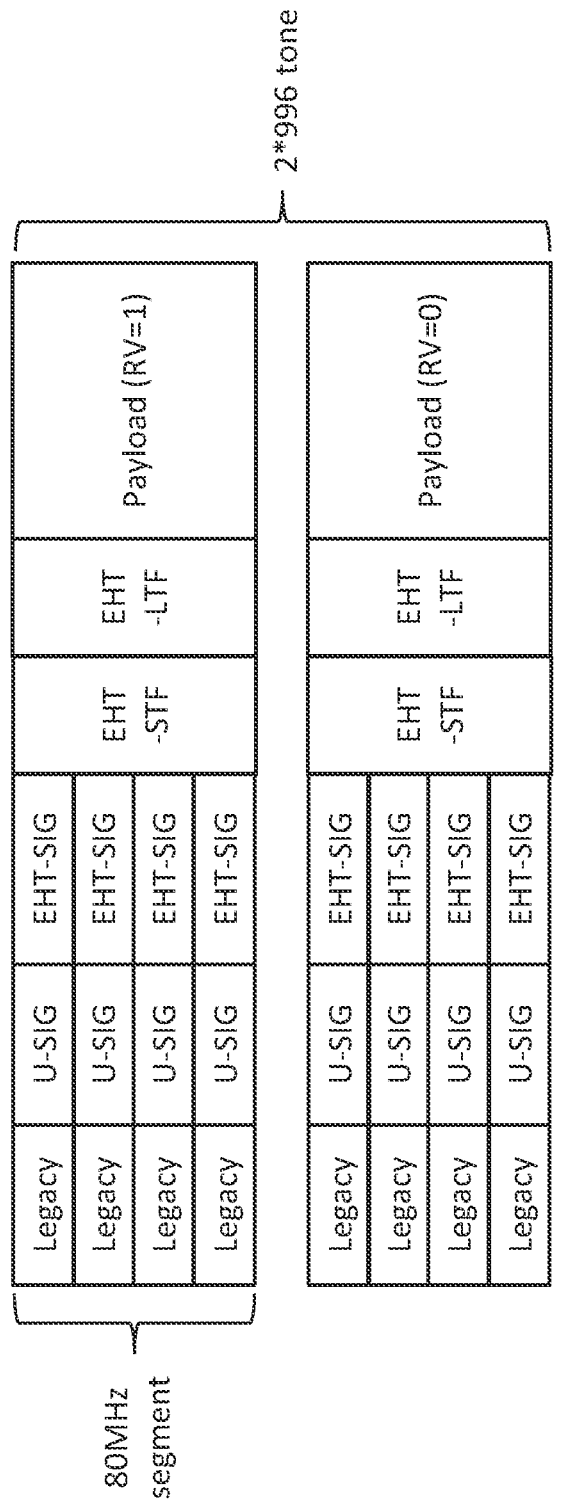
FIG. 28 illustrates an exemplary generalized dup mode PPDU format according to another embodiment.

FIG. 28 illustrates an exemplary generalized dup mode PPDU format of a case where an RU larger than 80 MHz is used. Further, FIG. 29 illustrates an exemplary generalized dup mode PPDU format of a case where the Multi-RU is used.

In these cases. STA 200 performs reception processing of an 80-MHz segment that includes a primary channel, for example. STA 200 identifies the size of RU that is allocated to STA 200, based on values of a BW field and Puncturing information field included in a preamble part.

For example, as illustrated in FIG. 28, when the RU allocated to STA 200 is larger than 80 MHz, STA 200 may perform reception processing of another 80 MHz segment that includes no primary channel and perform the HARQ combination of encoded sequences for respective subchannels included in a plurality of RUs allocated to STA 200.

Figure 29:
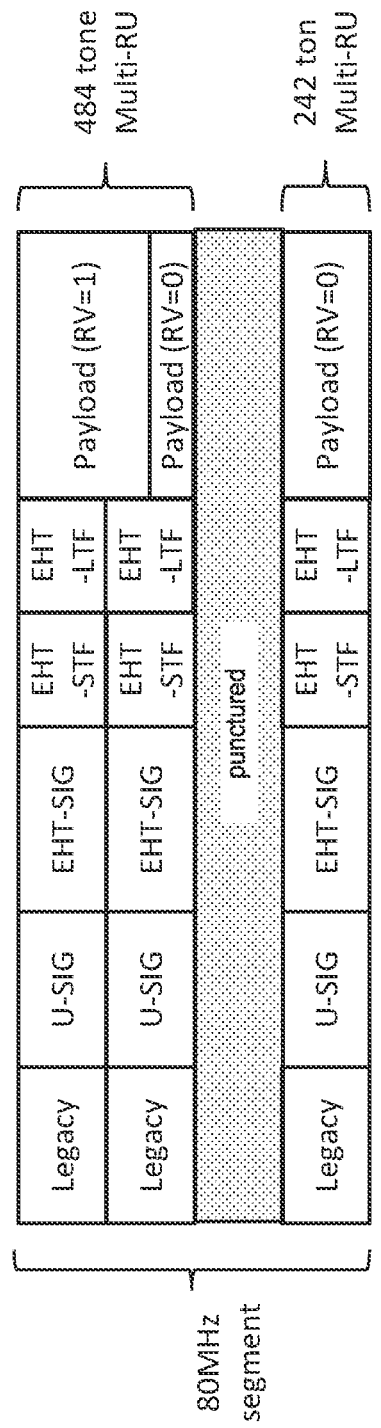
FIG. 29 illustrates an exemplary generalized dup mode PPDU format according to another embodiment.

Further, for example, as illustrated in FIG. 29, when the Multi-RU is allocated to STA 200, STA 200 may divide data subcarriers included in the Multi-RU by the number of subchannels so as to derive the number of data subcarriers included in each subchannel, and may then perform the HARQ combination.

Figure 30:
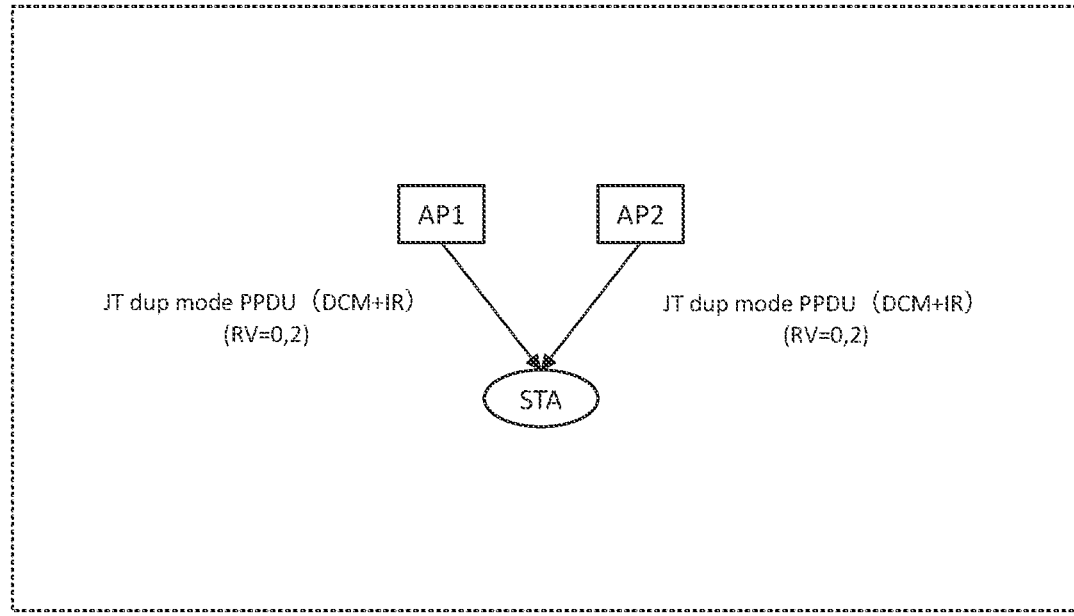
FIG. 30 illustrates an example of Joint Transmission (JT)
Figure 31:
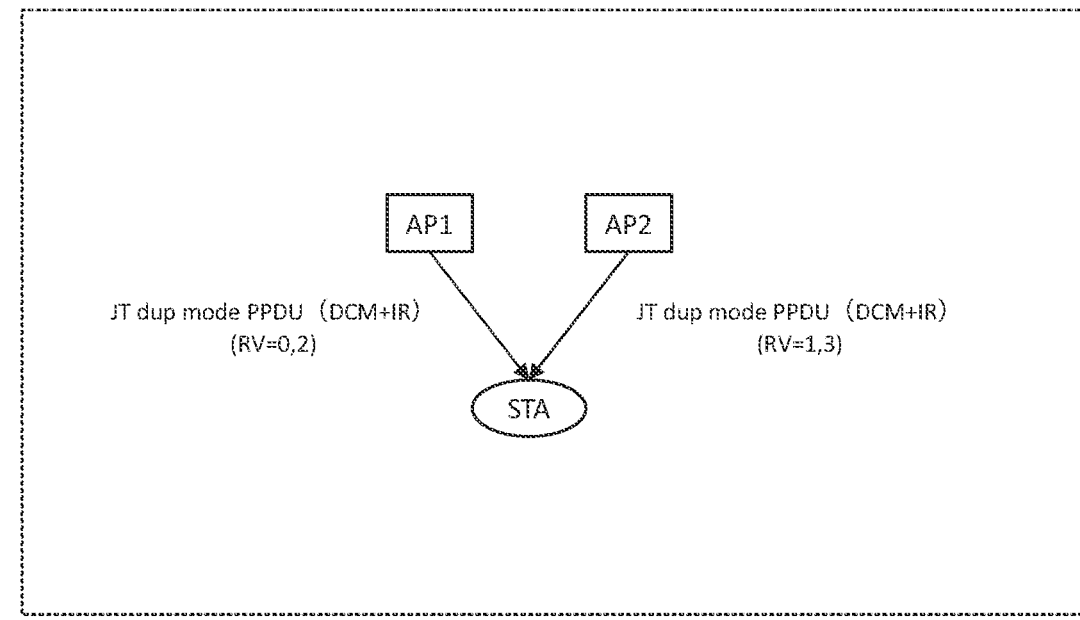
FIG. 31 illustrates an example of Distributed Multiple-Input Multiple Output (MIMO)

7. An exemplary embodiment of the present disclosure may be applied to a Multi-AP operation. FIGS. 30 and 31 each illustrate an exemplary Multi-AP operation.

For example, as illustrated in FIG. 30, two or more APs 100 (AP 1 and AP 2 in FIG. 30) may transmit a common generalized dup mode PPDU (including RVs=0 and 2 in FIG. 30) to STA 200 at the same time (e.g., referred to as Joint Transmission (JT)). As a result, a beamforming gain from the JT can be gained in addition to the coding gain from the HARQ combination.

Further, for example, as illustrated in FIG. 31, two or more APs 100 (AP 1 and AP 2 in FIG. 31) each may transmit a generalized dup mode PPDU including encoded sequences with different RVs to STA 200 at the same time (e.g., referred to as Distributed MIMO). As a result, the coding gain can be improved by an increase in the number of encoded sequences used for the HARQ combination.

8. In the above embodiment, in the case of the generalized dup mode that performs the DCM instead of the IR, patterns of a BCC interleaver and an LDPC tone mapper may be changed for each subchannel.

By way of example, a field that indicates switching the patterns of the BCC interleaver and the LDPC tone mapper per subchannel may be added to a preamble part (e.g., EHT-SIG).

9. In the above embodiment, STA 200 not supporting the DCM function (or not enabling DCM function) may receive a DCM signal via a primary channel, for example.

Figure 32:
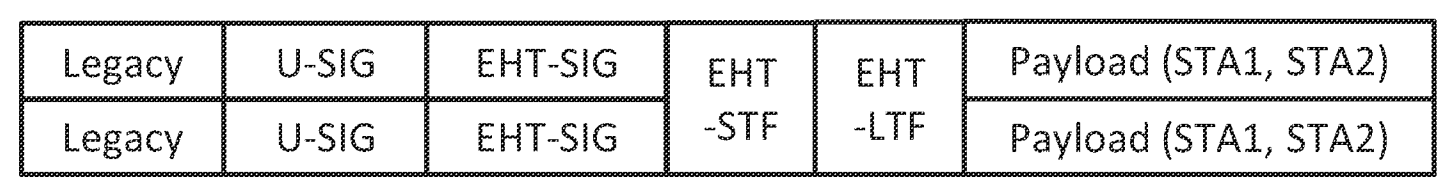

By way of example, AP 100 may transmit spatially multiplexed data to STA 1 supporting the DCM and STA 2 not supporting the DCM. FIG. 32 illustrates an exemplary PPDU format of an MU DCM signal in this case.

AP 100 may transmit signals where the DCM is applied to both data for STA 1 and STA 2, for example. Since STA 1 supports the DCM, the STA receives the signals transmitted from AP 100 via respective subchannels and extracting and combining a signal addressed to STA1, thereby obtaining a frequency diversity gain from the DCM, for example. Meanwhile, since STA 2 does not support the DCM, the STA receives the signals transmitted from AP 100 via a primary channel, extracts a signal addressed to STA 2, and then decodes the signal, for example.

10. In the above-described embodiment, a configuration example on the basis of a frame format of 11ax has been described as an example, but the format to which an exemplary embodiment of the present disclosure applied is not limited to the format of 11ax.

11. In the above-described embodiment, an operation in DL communication has been described, but an exemplary embodiment of the present disclosure may be applied to, for example, UL communication or sidelink without limited to the DL communication.

12. The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an exemplary embodiment of the present disclosure includes: reception circuitry, which, in operation, receives information on at least one of a plurality of modes relating to assignment of a data signal that is common, to a plurality of subcarrier groups; and control circuitry, which, in operation, controls combination of a signal that has been assigned to the plurality of subcarrier groups, based on the information on the at least one of the plurality of modes.

In an exemplary embodiment of the present disclosure, the plurality of modes includes a first mode, and in which, the first mode indicates that a signal corresponding to any of Redundancy Versions (RVs) of an error-correction code for the data signal is included in the plurality of subcarrier groups.

In an exemplary embodiment of the present disclosure, in the first mode, both the RV and modulation mapping vary between the plurality of subcarrier groups.

In an exemplary embodiment of the present disclosure, in the first mode, the RV varies between the plurality of subcarrier groups.

In an exemplary embodiment of the present disclosure, in the first mode, the RV varies between subcarrier groups arranged in a time domain.

In an exemplary embodiment of the present disclosure, the reception circuitry receives information on the at least one of the plurality of modes in at least a portion of a field of a terminal-specific control field, the field being for information that is different from the information on the at least one of the plurality of modes.

In an exemplary embodiment of the present disclosure, each of a plurality of candidates is associated with identification information, the plurality of candidates including a modulation scheme and the plurality of modes for the data signal, and the reception circuitry receives the identification information that has been associated with any one of the plurality of candidates.

A communication apparatus according to an exemplary embodiment of the present disclosure includes: control circuitry, which, in operation, configures at least one of a plurality of modes relating to assignment of a data signal that is common, to a plurality of subcarrier groups, and transmission circuitry, which, in operation, transmits information on the at least one of the plurality of modes, and a signal that has been assigned to the plurality of subcarrier groups.

In a communication method according to an exemplary embodiment of the present disclosure, a communication apparatus receives information on at least one of a plurality of modes relating to assignment of a data signal that is common, to a plurality of subcarrier groups, and controls combination of a signal that has been assigned to the plurality of subcarrier groups, based on the information on the at least one of the plurality of modes.

In a communication method according to an exemplary embodiment of the present disclosure, a communication apparatus configures at least one of a plurality of modes relating to assignment of a data signal that is common, to a plurality of subcarrier groups, and transmitting, by the communication apparatus, information on the at least one of the plurality of modes, and a signal that has been assigned to the plurality of subcarrier groups.

The disclosure of Japanese Patent Application No. 2020-185778, filed on Nov. 6, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 AP
101, 201 Radio receiver
102 Received signal decoder
103 Resource distributor
104 Data generator
105 Data encoder
106 Data modulator
107 Preamble generator
108, 207 Radio transmitter
200 STA
202 Preamble demodulator
203 Data demodulator
204 Data combiner
205 Data decoder
206 Transmission signal generator

The invention claimed is:
1. A communication apparatus, comprising:
reception circuitry, which, in operation, receives a Physical Layer Convergence Procedure Protocol Data Unit, PPDU, which includes a signal field, a first data signal and a second data signal, the first data signal and the second data signal being generated from a common information bit, and the signal field including information indicating at least one of a plurality of modes relating to assignment of the first data signal and the second data signal; and control circuitry, which, in operation, controls a combination of the first data signal and the second data signal, based on the information indicating the at least one of the plurality of modes, wherein:

the reception circuitry receives the information on the at least one of the plurality of modes relating to assignment of the first data signal and the second data signal to a plurality of subcarrier groups, and the control circuitry controls the combination of the first data signal and the second data signal that has been assigned to the plurality of subcarrier groups, based on the information on the at least one of the plurality of modes.

2. The communication apparatus according to claim 1, wherein the plurality of modes includes a first mode, and wherein the first mode indicates that a signal corresponding to any of Redundancy Versions (RVs) of an error-correction code for the first data signal and the second data signal is included in the plurality of subcarrier groups.

3. The communication apparatus according to claim 2, wherein, in the first mode, both the RV and modulation mapping vary between the plurality of subcarrier groups.

4. The communication apparatus according to claim 2, wherein, in the first mode, the RV varies between the plurality of subcarrier groups.

5. The communication apparatus according to claim 2, wherein, in the first mode, the RV varies between subcarrier groups arranged in a time domain.

6. The communication apparatus according to claim 1, wherein the reception circuitry receives the information on the at least one of the plurality of modes in at least a portion of a field of a terminal-specific control field, the field being for information that is different from the information on the at least one of the plurality of modes.

7. The communication apparatus according to claim 1, wherein:

each of a plurality of candidates is associated with identification information, the plurality of candidates including a modulation scheme and the plurality of modes for the first data signal and the second data signal, and the reception circuitry receives the identification information that has been associated with any one of the plurality of candidates.

8. A communication method, comprising:

receiving, by a communication apparatus, a, Physical Layer Convergence Procedure Protocol Data Unit, PPDU, which includes a signal field a first data signal and a second data signal, the first data signal and the second data signal being generated from a common information bit, and the signal field including information indicating at least one of a plurality of modes relating to assignment of the first data signal and the second data signal;

controlling, by the communication apparatus, a combination of the first data signal and the second data signal, based on the information on the at least one of the plurality of modes;

receiving, by the communication apparatus, the information on the at least one of the plurality of modes relating to assignment of the first data signal and the second data signal to a plurality of subcarrier groups; and controlling the combination of the first data signal and the second data signal that has been assigned to the plurality of subcarrier groups, based on the information on the at least one of the plurality of modes.

* * * * *